(12) United States Patent
Miyamura et al.

(10) Patent No.: US 12,266,807 B2
(45) Date of Patent: Apr. 1, 2025

(54) RECTANGULAR SECONDARY CELL AND METHOD FOR MANUFACTURING SAME

(71) Applicant: Panasonic Corporation, Osaka (JP)

(72) Inventors: Yukinobu Miyamura, Hyogo (JP); Hiroaki Imanishi, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 496 days.

(21) Appl. No.: 17/635,330

(22) PCT Filed: Jul. 30, 2020

(86) PCT No.: PCT/JP2020/029257
§ 371 (c)(1),
(2) Date: Feb. 14, 2022

(87) PCT Pub. No.: WO2021/039267
PCT Pub. Date: Mar. 4, 2021

(65) Prior Publication Data
US 2022/0320648 A1    Oct. 6, 2022

(30) Foreign Application Priority Data
Aug. 30, 2019  (JP) ................ 2019-158399

(51) Int. Cl.
*H01M 50/186*    (2021.01)
*H01M 10/04*    (2006.01)
(Continued)

(52) U.S. Cl.
CPC ......... *H01M 50/186* (2021.01); *H01M 10/04* (2013.01); *H01M 50/528* (2021.01); *H01M 50/531* (2021.01); *H01M 50/543* (2021.01)

(58) Field of Classification Search
CPC ............ H01M 50/183; H01M 50/528; H01M 50/531; H01M 50/543; H01M 10/04
See application file for complete search history.

(56) References Cited

U.S. PATENT DOCUMENTS 10,141,560 B2 * 11/2018 Okabe ................ H01M 50/534
2018/0183018 A1 * 6/2018 Maeda ................ H01M 50/55
(Continued)

FOREIGN PATENT DOCUMENTS

CN    108242526 A    7/2018
CN    109755454 A    5/2019
(Continued)

OTHER PUBLICATIONS

International Search Report issued in International Patent Application No. PCT/JP2020/029257, dated Oct. 20, 2020, with English translation.
(Continued)

*Primary Examiner* — Jane J Rhee
(74) *Attorney, Agent, or Firm* — Rimon P.C.

(57) ABSTRACT

A rectangular secondary battery includes: an electrode body; a current collector connected to an edge of the electrode; and an external terminal connected to the current collector. The current collector includes a first connector and a second connector integrated into a single member, the first connector being connected to the external terminal, the second connector being connected to the edge of the electrode body. The first connector penetrates through-holes of the sealing plate and the external terminal, and has a tip crimped so as to be connected to the external terminal and to fix the current collector and the external terminal to the sealing plate.

6 Claims, 37 Drawing Sheets

(51) Int. Cl.
  *H01M 50/528* (2021.01)
  *H01M 50/531* (2021.01)
  *H01M 50/543* (2021.01)

(56) References Cited

U.S. PATENT DOCUMENTS

2019/0019633 A1  1/2019  Ito
2019/0140218 A1  5/2019  Nemoto

FOREIGN PATENT DOCUMENTS

| | | |
|---|---|---|
| JP | 2012-243403 A | 12/2012 |
| JP | 2015-072746 A | 4/2015 |
| JP | 2016-100323 A | 5/2016 |
| JP | 2018-107122 A | 7/2018 |
| JP | 2018-137165 A | 8/2018 |
| JP | 2018-147683 A | 9/2018 |
| JP | 2019-133802 A | 8/2019 |
| WO | 2017/131168 A1 | 8/2017 |

OTHER PUBLICATIONS

Extended European Search Report issued in corresponding European Patent Application No. 20858291.6, dated Sep. 26, 2022.
English Translation of Chinese Search Report dated Feb. 2, 2024 for the related Chinese Patent Application No. 202080042629.6.

* cited by examiner

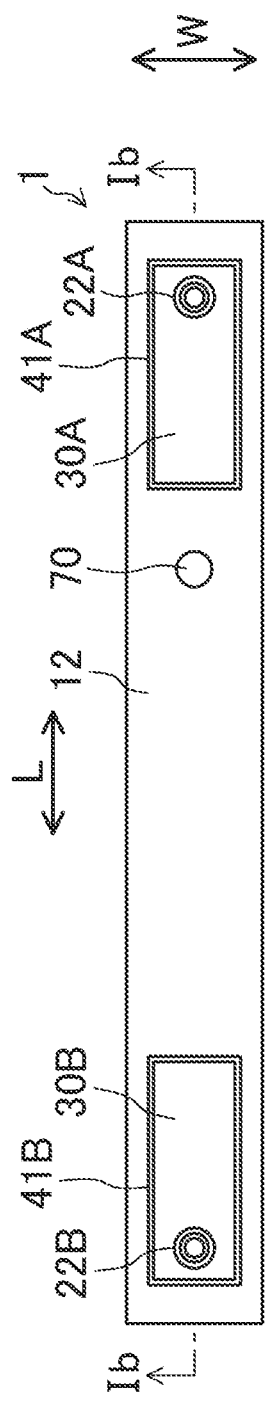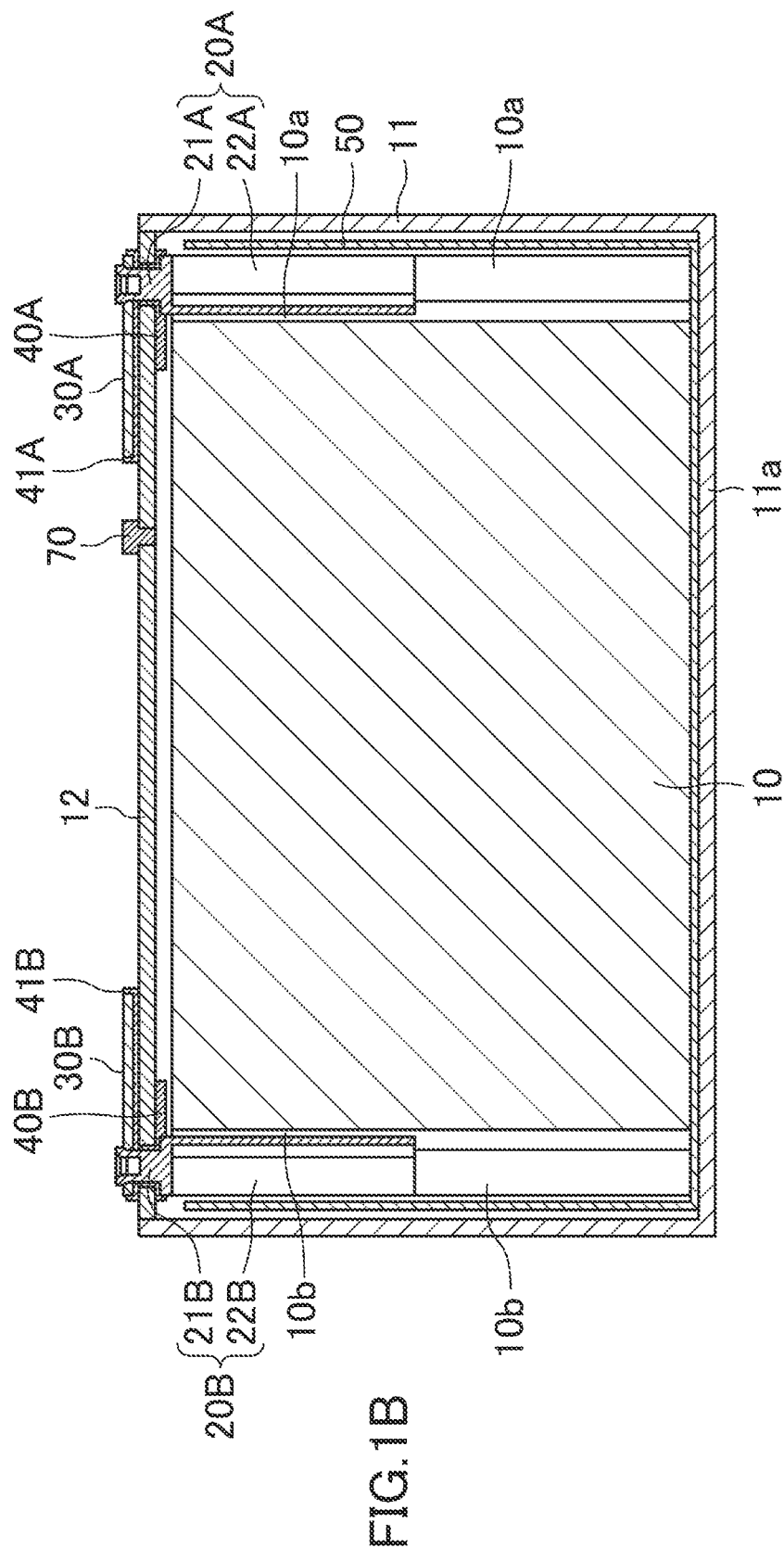

RECTANGULAR SECONDARY CELL AND METHOD FOR MANUFACTURING SAME

CROSS-REFERENCE OF RELATED APPLICATIONS

This application is the U.S. National Phase under 35 U.S.C. § 371 of International Patent Application No. PCT/JP2020/029257, filed on Jul. 30, 2020, which in turn claims the benefit of Japanese Application No. 2019-158399, filed on Aug. 30, 2019, the entire disclosures of which Applications are incorporated by reference herein.

TECHNICAL FIELD

The present disclosure relates to a rectangular secondary battery and a method of manufacturing the battery.

BACKGROUND ART

As a known current collecting structure of a secondary battery, an electrode body including positive and negative electrode plates is connected to an external terminal via a current collector.

Patent Document 1 discloses, as shown in FIG. 37, a secondary battery 100 including, at an end of an electrode body 110, a current collector 120 with a connector 120A connected to an external terminal 130. The external terminal 130 has a cylindrical part 130A penetrating the through-holes of an insulating member 150, a sealing plate 140, an insulating member 160, and the connector 120A of the current collector 120 to project inside the sealing plate 140. The tip of the cylindrical part 130A is then crimped. Accordingly, the current collector 120 is connected to the external terminal 130, and the current collector 120 and the external terminal 130 are fixed to the sealing plate 140.

CITATION LIST

Patent Document

Patent Document 1: PCT International Publication No. WO 2017/131168

SUMMARY OF THE INVENTION

In the secondary battery with the current collecting structure disclosed in Patent Document 1, the tip of the cylindrical part 130A of the external terminal 130 penetrates the opening of the connector 120A of the current collector 120 to project inside the sealing plate 140 so as to be crimped. There is thus a need to keep a certain distance between the crimp and the electrode body 110 necessary for the crimping processing. In addition, a large load is applied to the connector 120A of the current collector 120 to crimp the tip of the cylindrical part 130A. Each of the insulating member 160 and the connector 120A of the current collector 120 needs to have a thickness with an enough rigidity to withstand the load at the time of crimping. This results in a large distance D between the sealing plate 140 and the electrode body 110, as shown in FIG. 37.

The space between the sealing plate 140 and the electrode body 110 is a dead space that does not contribute to the battery capacity. A large distance D between the sealing plate 140 and the electrode body 110 hinders an increase in the capacity and energy density of the secondary battery. In particular, on-vehicle secondary batteries are required to have low profile cells in addition to a large size. There is thus a need to reduce the distance D between the sealing plate 140 and the electrode body 110 to increase the capacity and energy density of the secondary battery.

A rectangular secondary battery according to the present disclosure includes: an electrode body including a positive electrode plate and a negative electrode plate; a rectangular battery case having an opening and housing the electrode body; a sealing plate sealing the opening; a current collector connected to an edge of the positive electrode plate or the negative electrode plate at a longitudinal end of the sealing plate; and an external terminal located outside the sealing plate and connected to the current collector. The current collector includes a first connector and a second connector integrated into a single member, the first connector being connected to the external terminal, the second connector being connected to the edge of the positive electrode plate or the negative electrode plate. The first connector penetrates through-holes of the sealing plate and the external terminal from an inside to an outside of the sealing plate, and has a tip crimped so as to be connected to the external terminal and to fix the current collector and the external terminal to the sealing plate.

The present disclosure provides a secondary battery with a current collecting structure suitable for a high capacity and a high energy density.

BRIEF DESCRIPTION OF THE DRAWINGS

FIG. 1A is a top view schematically showing a configuration of a rectangular secondary battery according to an embodiment of the present disclosure.

FIG. 1B is a cross-sectional view taken along the line Ib-Ib of FIG. 1A.

DESCRIPTION OF EMBODIMENTS

Figure 2:
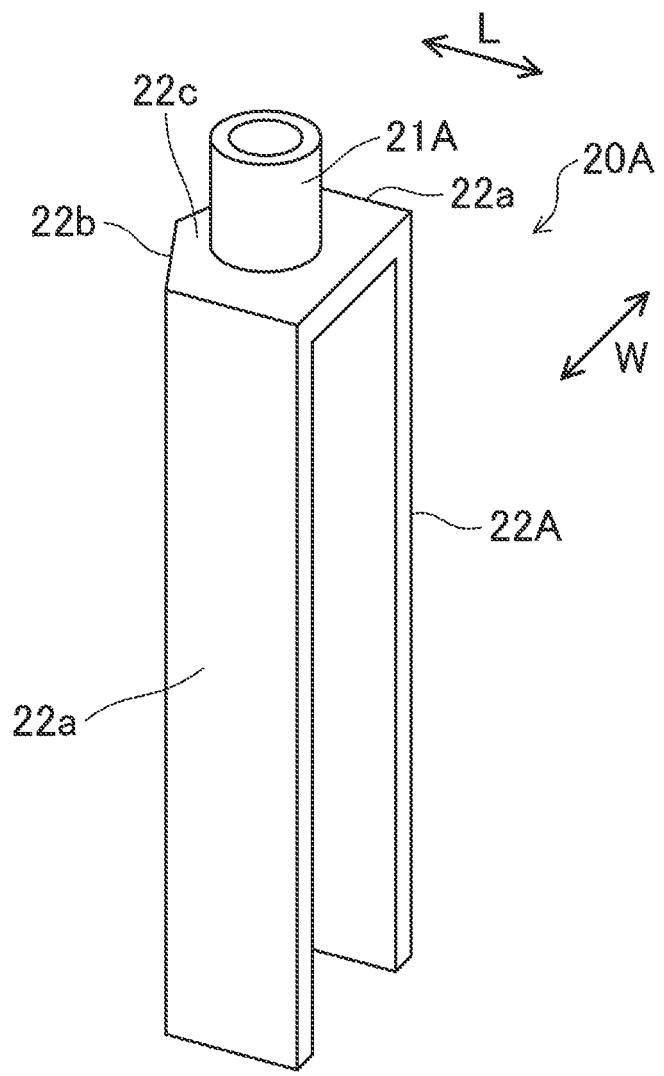
FIG. 2 is a perspective view schematically showing a configuration of a current collector according to the embodiment.

Embodiments of the present disclosure are described below with reference to the drawings. Note that the present disclosure is not limited to the following embodiments. Modifications may be made as appropriate without departing from the scope of the advantages of the present disclosure.

FIGS. 1A and 1B schematically show a configuration of a rectangular secondary battery according to an embodiment of the present disclosure. FIG. 1A is a top view, whereas FIG. 1B is a cross-sectional view taken along the line Ib-Ib of FIG. 1A.

As shown in FIGS. 1A and 1B, in a rectangular secondary battery 1 according to this embodiment, an electrode body 10, which is a power generation element, is housed together with an electrolyte in a rectangular battery case 11. The structure of the electrode body 10 is obtained by stacking a positive electrode plate and a negative electrode plate with a separator (none of them are shown) interposed therebetween. The positive electrode plate includes a positive electrode active material layer on the surface of a positive electrode core, while the negative electrode plate includes a negative electrode active material layer on the surface of a negative electrode core. The battery case 11 has an opening sealed with a sealing plate 12.

Each of the positive and negative electrode plates has exposures 10a and 10b, in which the active material layer is not formed, at the edge of the sealing plate 12 in the longitudinal direction L. The exposures 10a and 10b extend in opposite directions along the length of the sealing plate 12 and are connected to positive and negative current collectors 20A and 20B, respectively. Specifically, the plurality of exposures 10a and 10b are joined to the current collectors 20A and 20B, respectively, while being bundled. The joining may be laser welding, for example. Located outside the sealing plate 12 are positive and negative external terminals 30A and 30B connected to the positive and negative current collectors 20A and 20B, respectively. The electrode body 10 and the current collectors 20A and 20B are wrapped in an insulating holder 50 and housed in the battery case 11.

The materials of the current collectors 20A and 20B are not particularly limited as long as being free from the influence of positive and negative electrode potentials in the electrolyte. The current collectors 20A and 20B may be made of the same materials as the exposures 10a and 10b of the positive and negative electrode plates, respectively, in one preferred embodiment. For example, in the case of a lithium ion secondary battery, the (positive) current collector 20A connected to the exposure 10a of the positive electrode plate is made of aluminum or an aluminum alloy in one preferred embodiment. The (negative) current collector 20B connected to the exposure 10b of the negative electrode plate is made of copper or a copper alloy in one preferred embodiment.

FIG. 2 is a perspective view schematically showing a configuration of the positive electrode current collector 20A. The negative electrode current collector 20B has the same configuration. In the following description, otherwise not specified, the description of the current collecting structure including the negative electrode current collector 20B will be omitted.

As shown in FIG. 2, the current collector 20A includes first and second connectors 21A and 22A integrated into a single member. The first connector 21A is in the shape of a cylinder. The second connector 22A is in the shape of a plate. The second connector 22A has first and second side surfaces 22a and 22b. The first side surfaces 22a are parallel to the longitudinal direction L of the sealing plate 12. The second side surface 22b is parallel to the width direction W of the sealing plate 12 and facing the electrode body 10. In this embodiment, the second side surface 22b has a center protruding and bending, but may have a flat shape. The second connector 22A has, at the first connector 21A, an end having an upper surface 22c parallel to the sealing plate 12.

In this embodiment, the second connector 22A has a substantially U-shaped cross-section parallel to the sealing plate 12. The axis of the cylindrical first connector 21A and the first side surfaces 22a of the second connector 22A overlap with each other in the width direction of the sealing plate 12.

The current collector 20A with such a configuration can be prepared by rolling processing, for example. Alternatively, the first and second connectors 21A and 22A may be prepared as separate parts and then integrated by welding, for example.

As shown in FIG. 1B, the first connector 21A penetrates the through-holes of a first insulating member 40A inside the sealing plate 12, the sealing plate 12, a second insulating member 41A outside the sealing plate 12, and the external terminal 30A from the inside to the outside of the sealing plate 12. The first connector 21A has the tip crimped so as to be connected to the external terminal 30A and to fix the current collector 20A and the external terminal 30A to the sealing plate 12. Here, the current collector 20A is insulated from the sealing plate 12 by the first insulating member 40A, whereas the external terminal 30A is insulated from the sealing plate 12 by the second insulating member 41A.

Now, a procedure of assembling the rectangular secondary battery 1 according to this embodiment will be described with reference to FIGS. 3 to 9.

Figure 3:
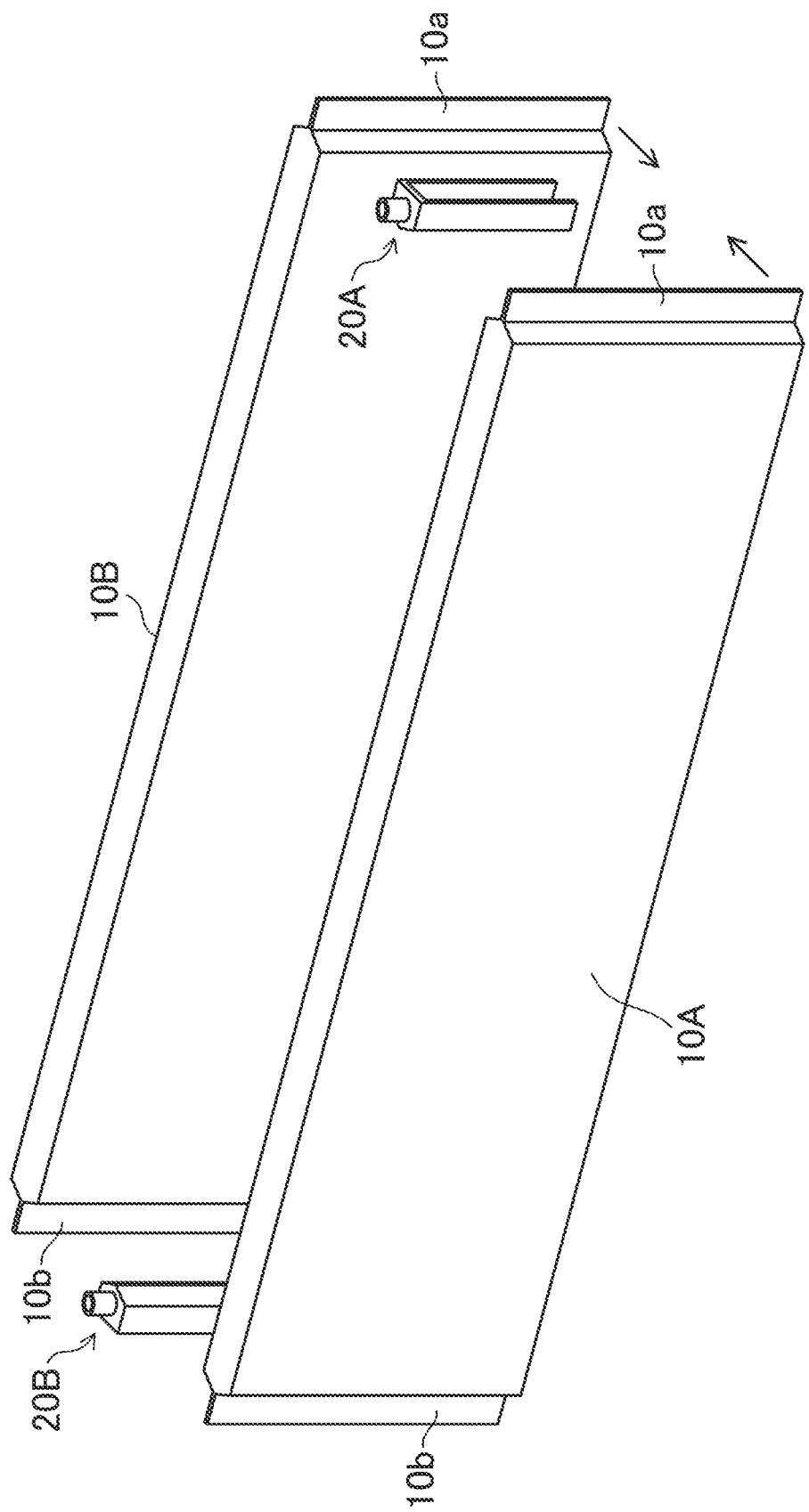
FIG. 3 illustrates a procedure of assembling the rectangular secondary battery according to the embodiment.

First, as shown in FIG. 3, two electrode bodies 10A and 10B with the same structure and the positive and negative current collectors 20A and 20B are prepared. Each of the electrode bodies 10A and 10B has positive and negative exposures 10a and 10b at respective ends in the longitudinal direction L of the sealing plate 12. The current collectors 20A and 20B have a configuration as shown in FIG. 2. The current collectors 20A and 20B at the respective ends of the sealing plate 12 in the longitudinal direction L are sandwiched by the exposures 10a and 10b of the electrode bodies 10A and 10B, respectively, along the arrow in the figure.

Figure 4:
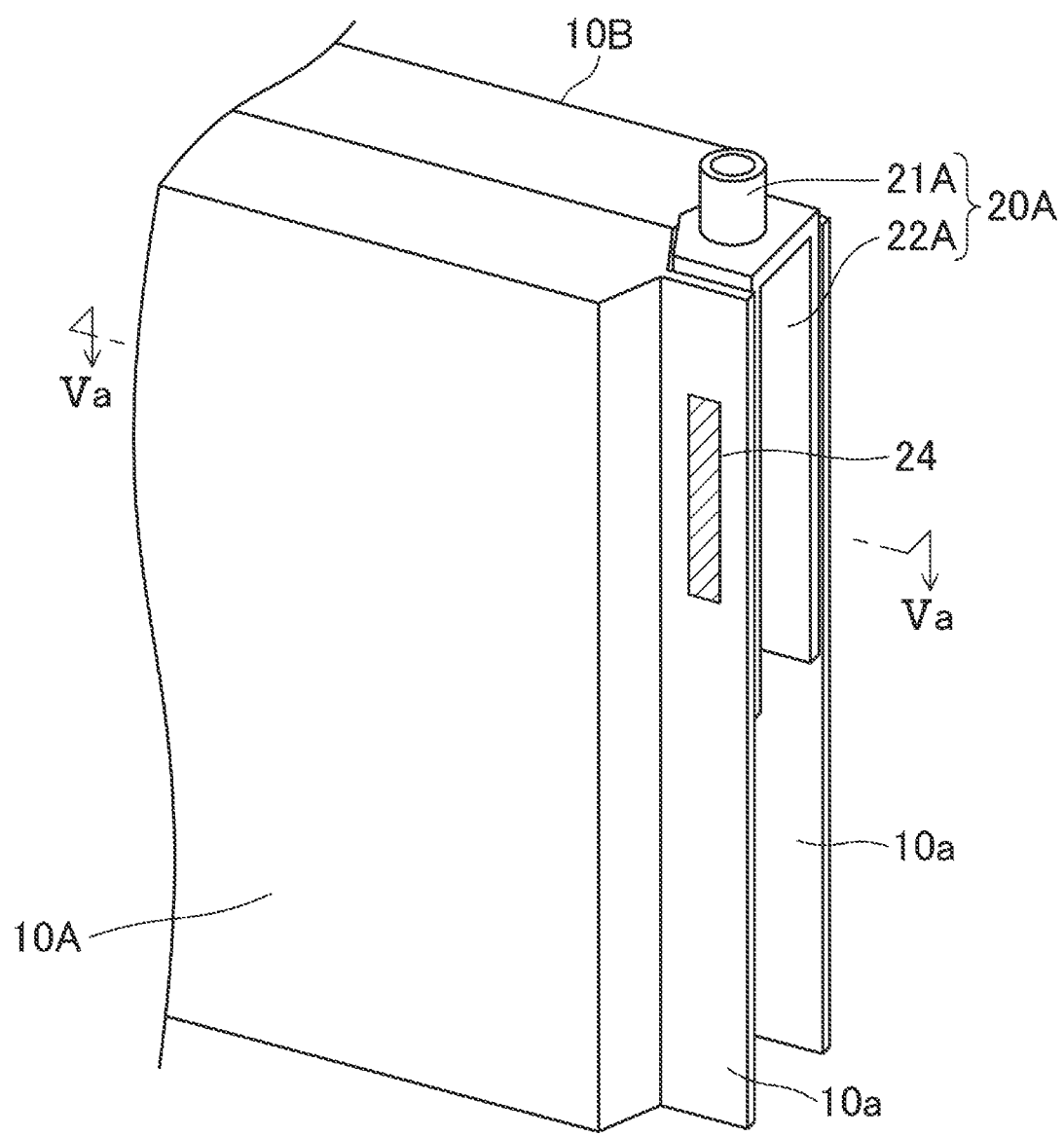
FIG. 4 illustrates the procedure of assembling the rectangular secondary battery according to the embodiment.
Figure 5A:
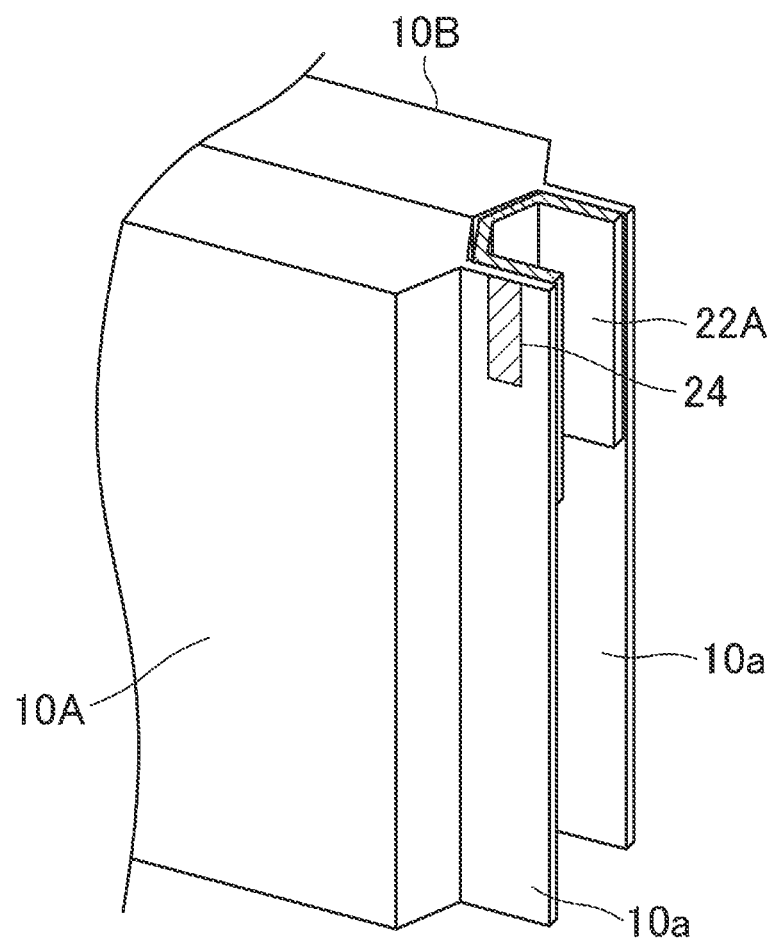
FIG. 5A illustrates the procedure of assembling the rectangular secondary battery according to the embodiment.
Figure 5B:
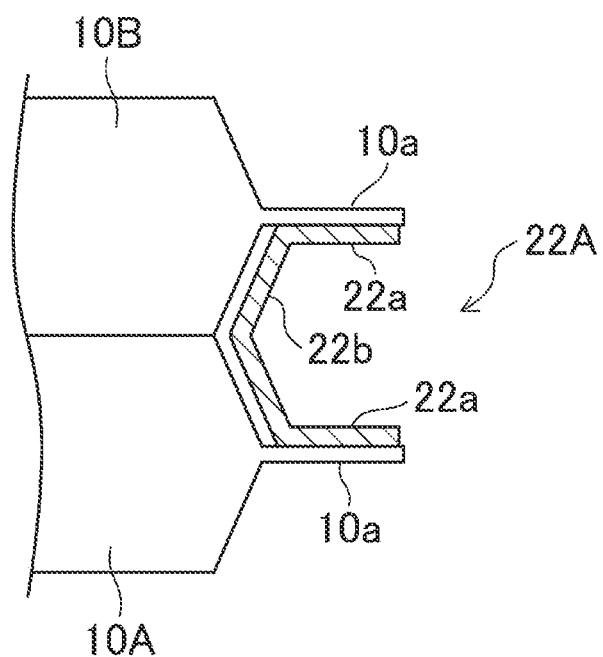
FIG. 5B illustrates the procedure of assembling the rectangular secondary battery according to the embodiment.

FIG. 4 is a partial perspective view showing the current collector 20A sandwiched between the exposures 10a and 10a of the electrode bodies 10A and 10B. FIGS. 5A and 5B are a cross-sectional perspective view and a cross-sectional view, respectively, taken along the line Va-Va of FIG. 4.

As shown in FIG. 5B, the second connector 22A abuts on the exposures 10a and 10a of the electrode bodies 10A and 10B on the first side surfaces 22a and 22a parallel to the longitudinal direction L of the sealing plate 12. As shown in FIG. 4, in a joint area 24 including the abutting planes, the exposures 10a and 10a and the second connector 22A are joined by laser welding, for example.

Figure 6:
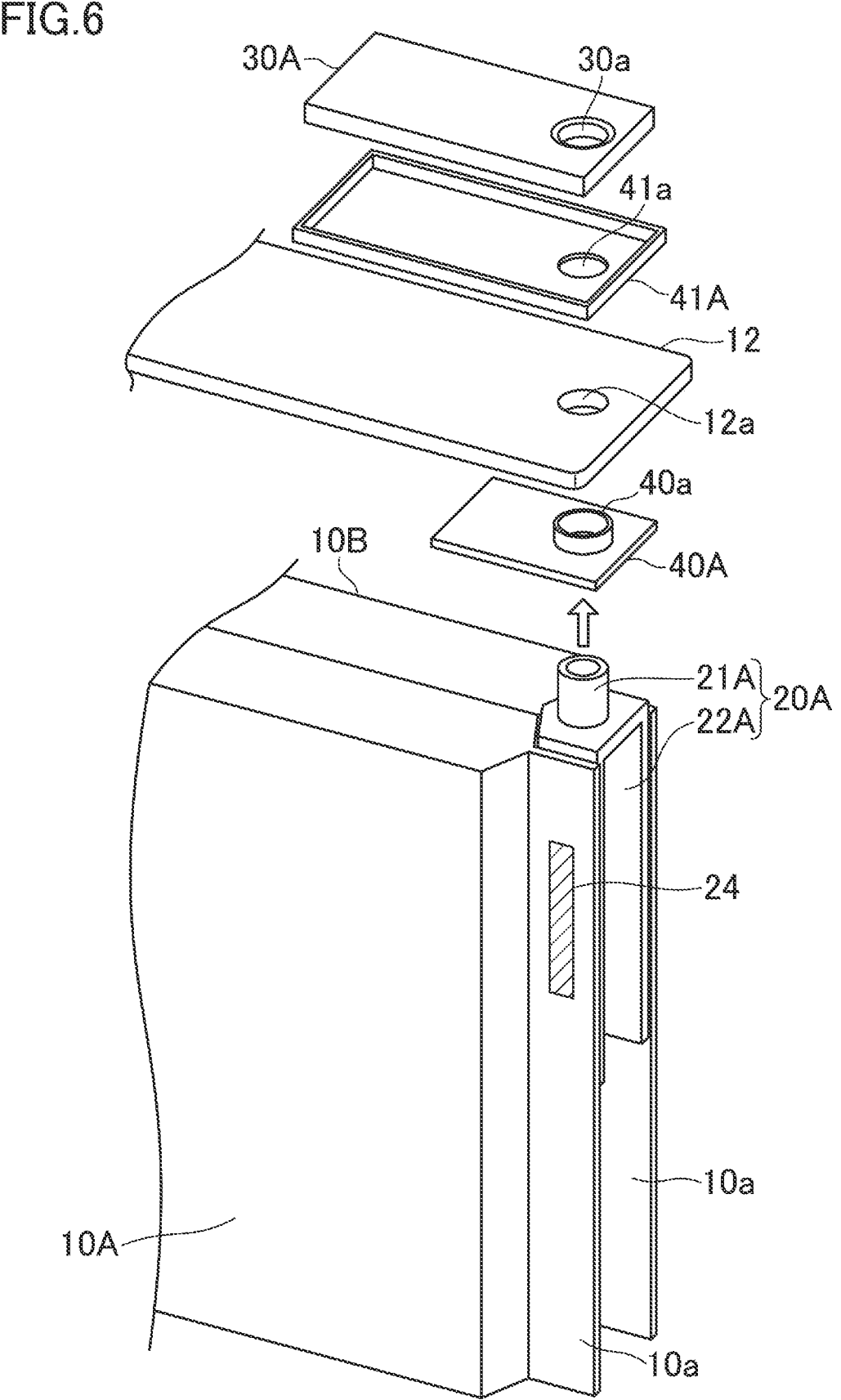
FIG. 6 illustrates the procedure of assembling the rectangular secondary battery according to the embodiment.

As shown in FIG. 6, the first insulating member 40A, the sealing plate 12, the second insulating member 41A, and the external terminal 30A are placed in this order above the current collector 20A connected to the electrode bodies 10A and 10B. Here, the first insulating member 40A, the sealing plate 12, the second insulating member 41A, and the external terminal 30A are arranged with the axes of the through-holes 40a, 12a, 41a, and 30a thereof aligned. Then, the first connector 21A of the current collector 20A penetrates the through-holes 40a, 12a, 41a, and 30a of the first insulating member 40A, the sealing plate 12, the second insulating member 41A, and the external terminal 30A along the arrow.

Figure 7:
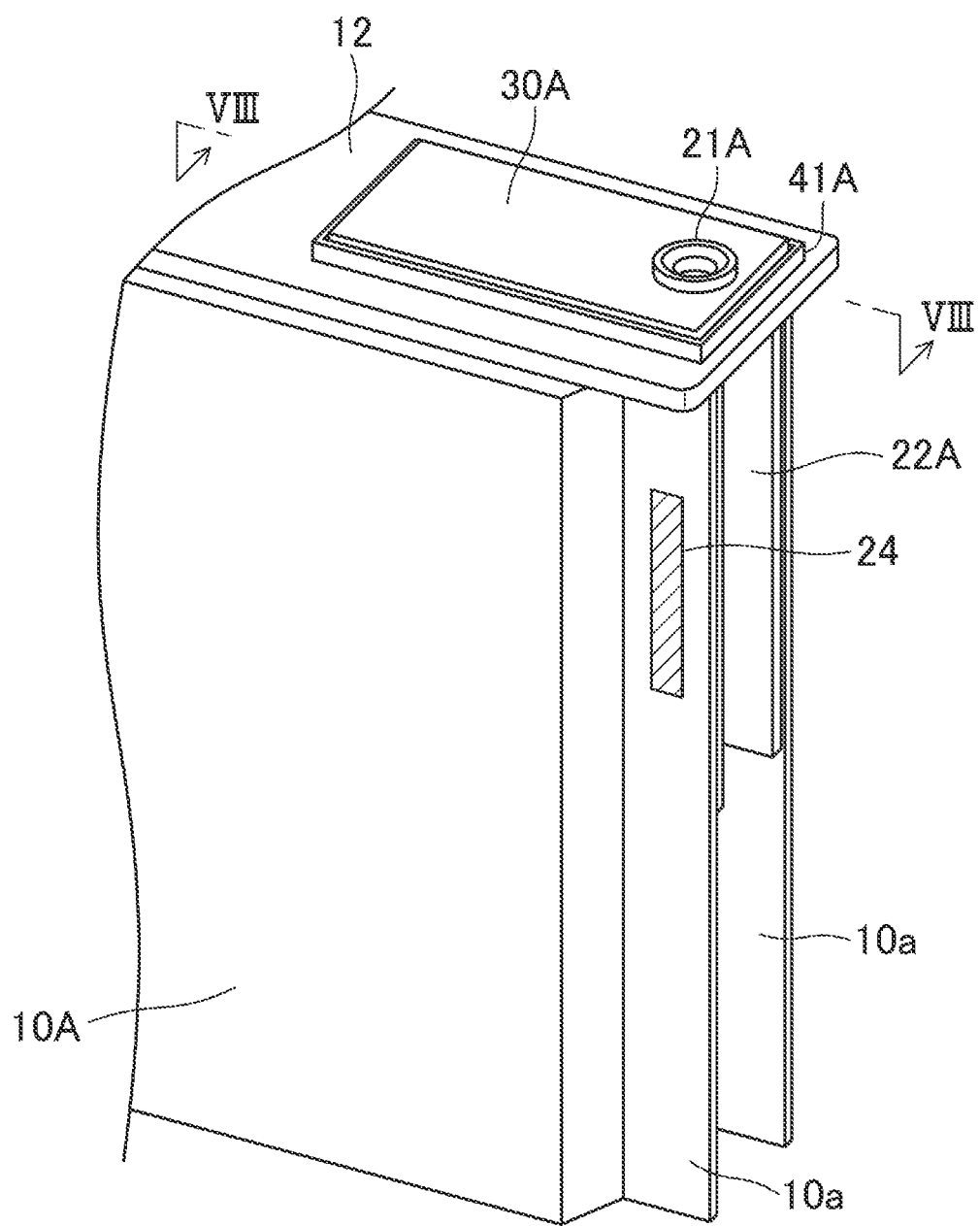
FIG. 7 illustrates the procedure of assembling the rectangular secondary battery according to the embodiment.
Figure 8:
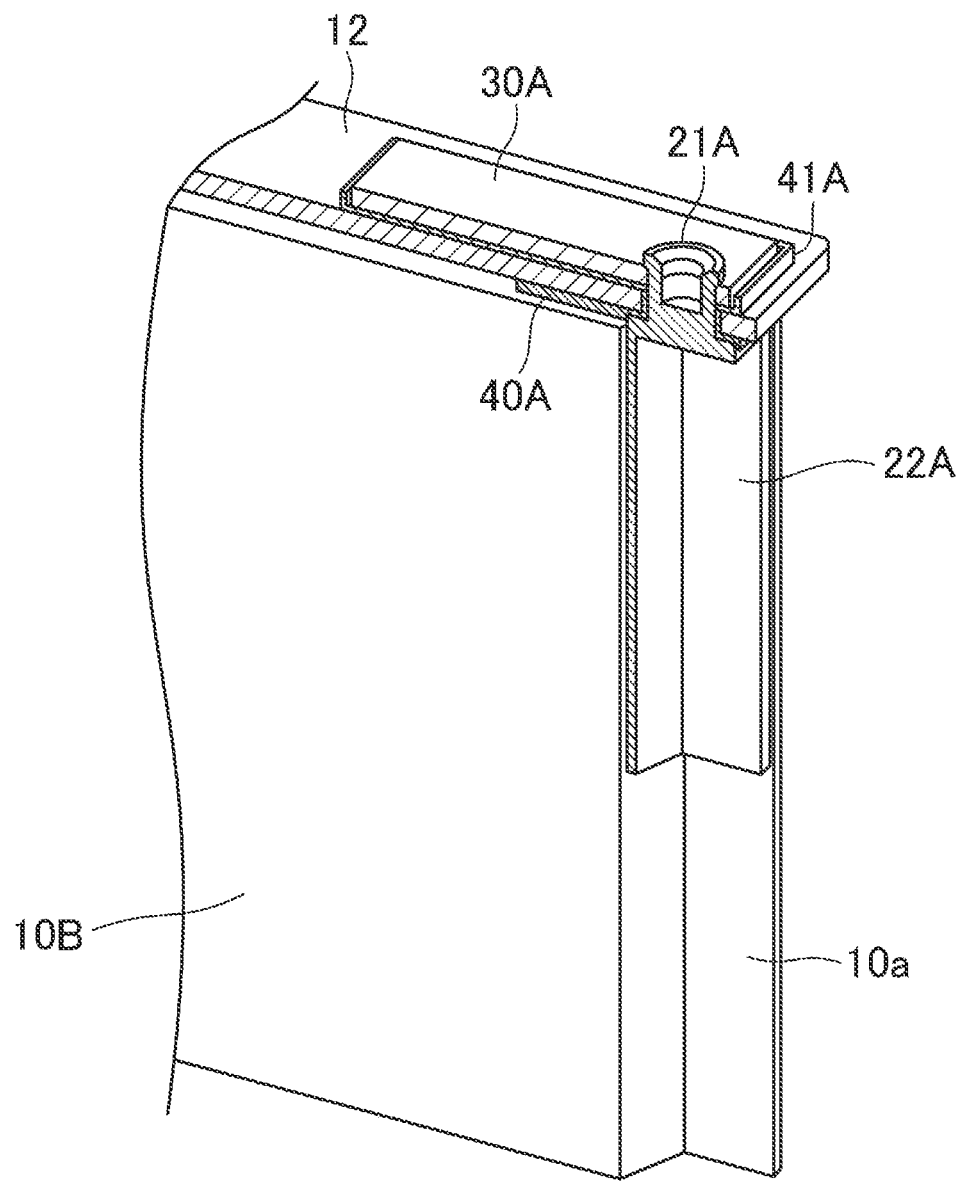
FIG. 8 illustrates the procedure of assembling the rectangular secondary battery according to the embodiment.

FIG. 7 is a partial perspective view showing a state after crimping the tip of the first connector 21A projecting through the through-hole 30a of the external terminal 30A. FIG. 8 is a cross-sectional perspective view taken along the line VII-VII of FIG. 7.

As shown in FIGS. 7 and 8, the tip of the first connector 21A is crimped to connect the first connector 21A to the external terminal 30A and to fix the current collector 20A and the external terminal 30A to the sealing plate 12. In addition, the first insulating member 40A inside the sealing plate 12 is pressed by the upper surface 22c (see FIG. 2) of the second connector 22A facing the first connector 21A so as to be fixed to the sealing plate 12.

After crimping the tip of the first connector 21A, the peripheral edge of the first connector 21A and the external terminal 30A may be fusion-bonded by laser welding, for example. This further reduces the electrical resistance between the current collector 20A and the external terminal 30A.

Figure 9:
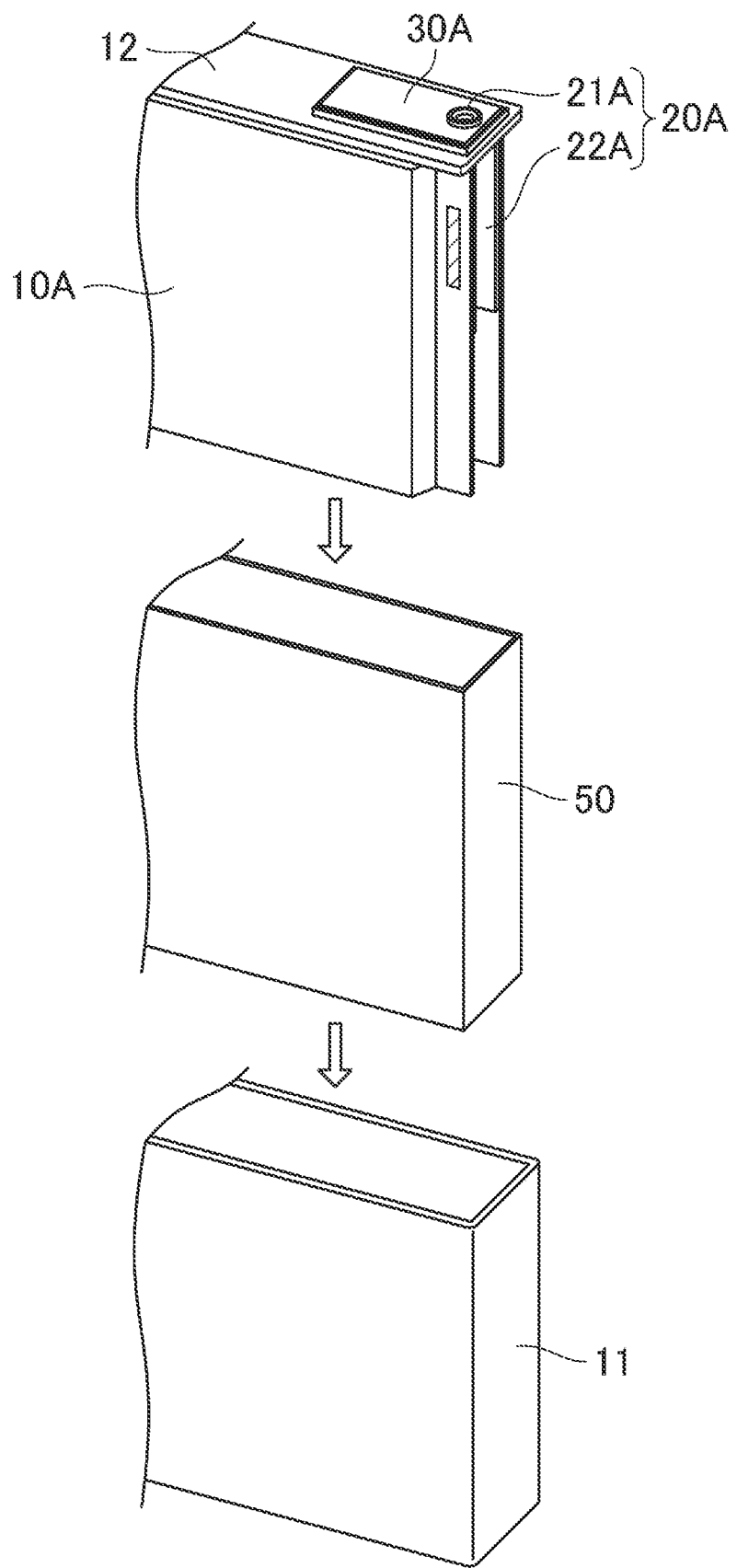
FIG. 9 illustrates the procedure of assembling the rectangular secondary battery according to the embodiment.

Next, as shown in FIG. 9, the sealing plate 12, to which the current collector 20A and the external terminal 30A are integrally fixed, is inserted into the insulating holder 50. The electrode bodies 10A and 10B and the current collector 20A wrapped in the insulating holder 50 are then housed in the battery case 11. After that, the end of the battery case 11 closer to the opening and the outer periphery of the sealing plate 12 are welded with laser, for example, to seal the battery case 11. At the end, an electrolyte is poured into the battery case 11 through a liquid inlet (not shown) in the sealing plate 12, and then the liquid inlet is closed with a plug 70 (see FIGS. 1A and 1B).

As described above, in this embodiment, the first connector 21A of the current collector 20A penetrates the through-holes 12a and 30a of the sealing plate 12 and the external terminal 30A from the inside to the outside of the sealing plate 12, and has the tip crimped so as to be connected to the external terminal 30A and to fix the current collector 20A and the external terminal 30A to the sealing plate 12. That is, the tip of the first connector 21A of the current collector 20A projects outside the sealing plate 12 so as to be crimped. There is thus no need to keep a certain distance between the crimp and the electrode body 10A necessary for the crimping processing, unlike the typical case where the tip of the cylinder of the external terminal projects inside the sealing plate so as to be crimped. This configuration reduces the distance between a sealing plate 140 and an electrode body 110.

In addition, the first and second connectors 21A and 22A are integrated. Accordingly, when the tip of the first connector 21A projects outside the sealing plate 12 so as to be crimped, the first insulating member 40A inside the sealing plate 12 is pressed by the upper surface 22c of the second connector 22A so as to be fixed to the sealing plate 12. There is thus only the first insulating member 40A between the sealing plate 12 and the second connector 22A. Accordingly, the electrode body 10 connected to the second connector 22A comes closer but not to come into contact with the first insulating member 40A, including manufacturing tolerances.

As described above, this embodiment reduces the distance between the sealing plate 12 and the electrode bodies 10A and 10B, and thus provides a secondary battery with a current collecting structure suitable for a high capacity and a high energy density.

Assume that, after crimping the tip of the first connector 21A, the peripheral edge of the first connector 21A and the external terminal 30A are fusion-bonded by laser welding, for example, to reduce the electrical resistance between the current collector 20A and the external terminal 30A in addition to the advantages described above. Even in this case, a sputtering residue at the time of the laser welding does not enter the battery case 11 in the assembly process of the secondary battery. Accordingly, a highly reliable secondary battery can be provided.

In this embodiment, the current collector 20A includes the first and second connectors 21A and 22A integrated into a single member. Here, with the tip crimped, the first connector 21A is connected to the external terminal 30A and thus has a cylindrical structure. On the other hand, since the second connector 22A is connected to the edge of the electrode body 10 (i.e., the positive or negative electrode plate), and thus needs to have, as a structure, at least a side surface connected to the edge of the electrode body 10.

For example, the current collector 20A illustrated in FIG. 2 is in the shape of a plate having first side surfaces 22a with a width in the longitudinal direction L of the sealing plate 12, and is connected to the edge of the electrode body 10 on the first side surfaces 22a.

However, the structure of the second connector 22A is not limited thereto, and may be determined as appropriate in accordance with the required current collecting characteristics, and/or the configuration of the electrode body, for example. Now, various variations of the current collector 20A will be illustrated. All current collectors 20A illustrated below includes a first connector 21A and a second connector 22A integrated into a single member. The first connector 21A is connected to the external terminal 30A, whereas the second connector 22A is connected to the edge of the positive or negative electrode plate.

First Variation

Figure 10:
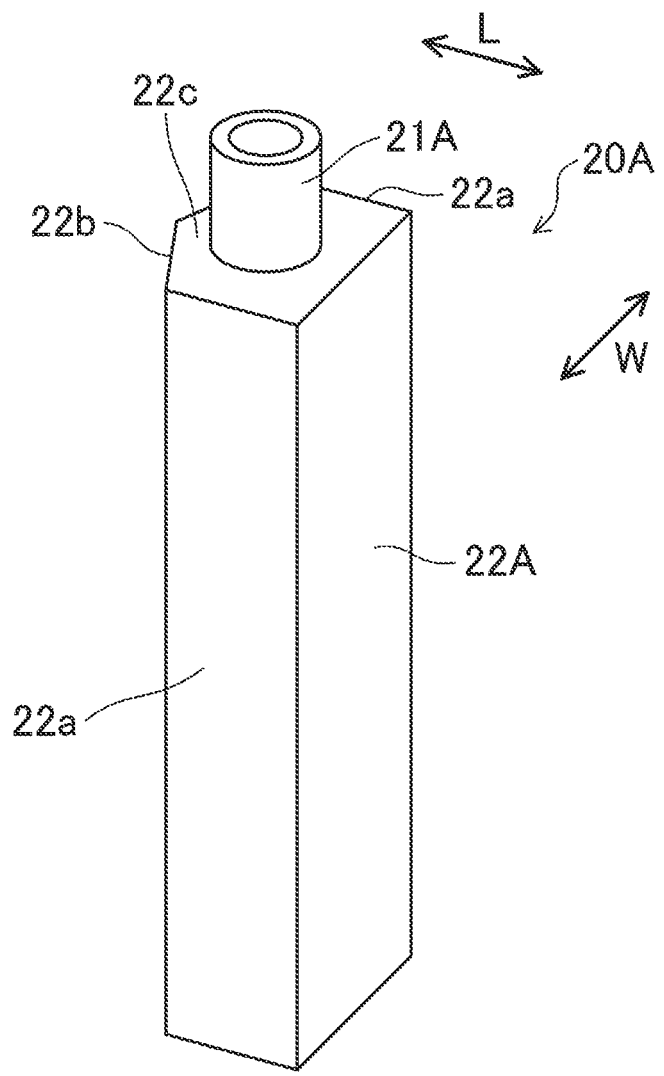
FIG. 10 is a perspective view schematically showing a configuration of a current collector according to a first variation.

FIG. 10 is a perspective view schematically showing a configuration of the current collector 20A according to a first variation.

As shown in FIG. 10, in this first variation, the first connector 21A of the current collector 20A is in the shape of a cylinder, and the second connector 22A is in the shape of a block with a thickness in the width direction W of the sealing plate 12.

The second connector 22A has first and second side surfaces 22a and 22b. The first side surfaces 22a are parallel to the longitudinal direction L of the sealing plate 12. The second side surface 22b is parallel to the width direction W of the sealing plate 12. The second connector 22A has, at the first connector 21A, an end having the upper surface 22c parallel to the sealing plate 12.

Figure 11:
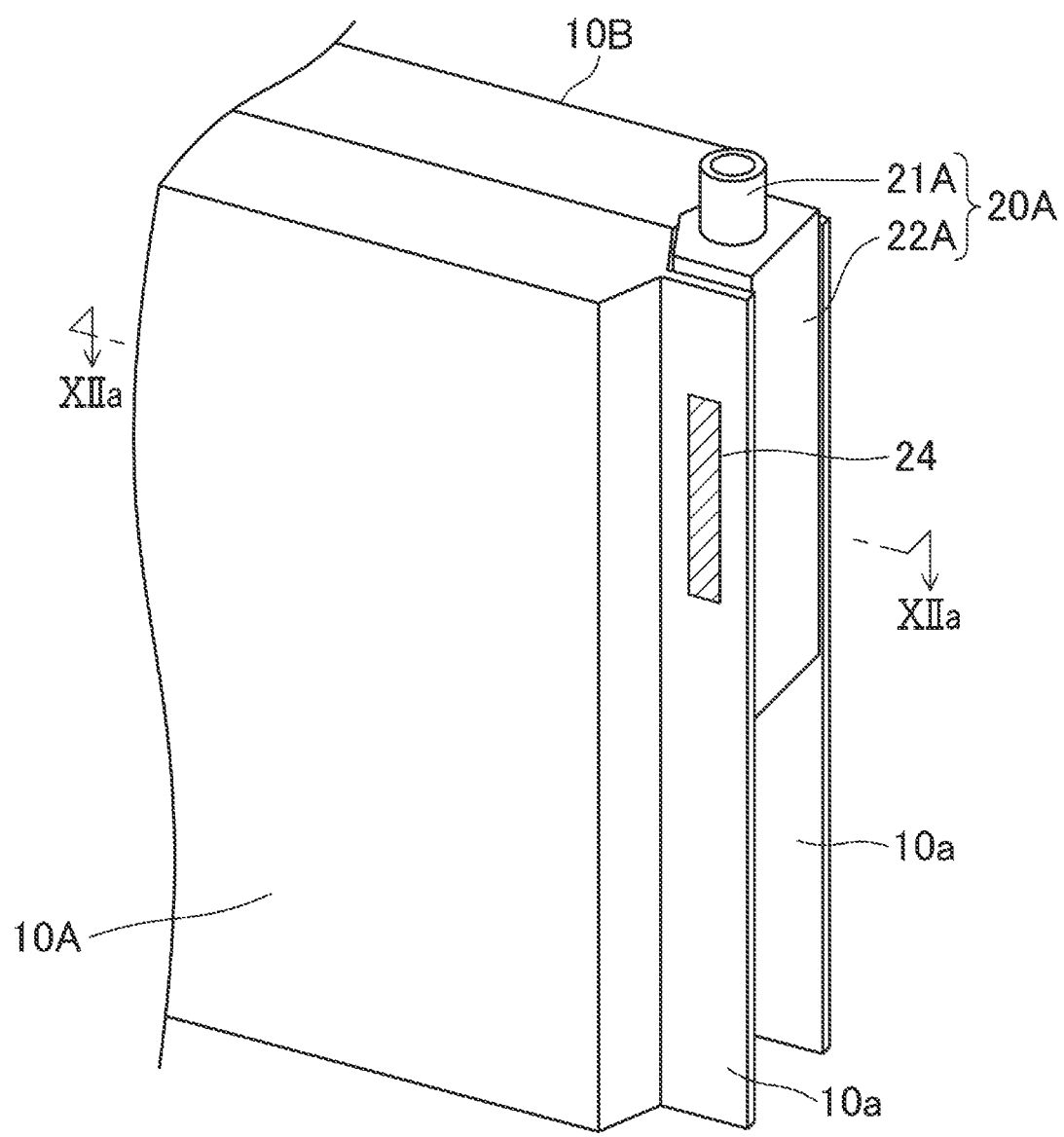
FIG. 11 is a partial perspective view showing the current collector sandwiched between exposures of electrode bodies according to the first variation.
Figure 12A:
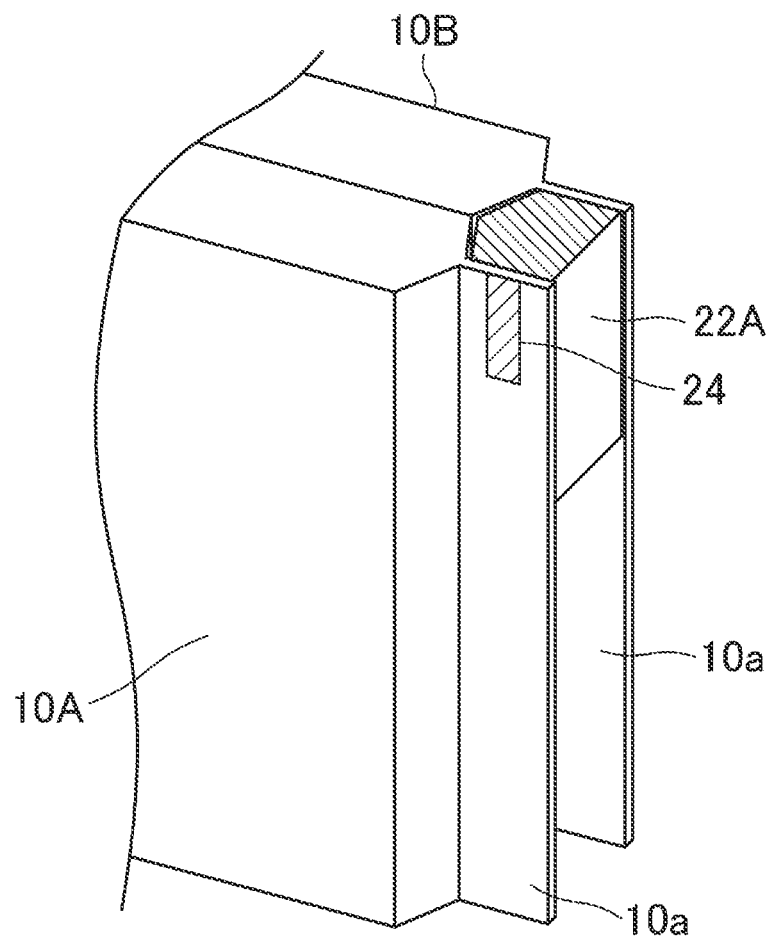
FIG. 12A is a cross-sectional perspective view taken along the line XIIa-XIIa of FIG. 11.
Figure 12B:
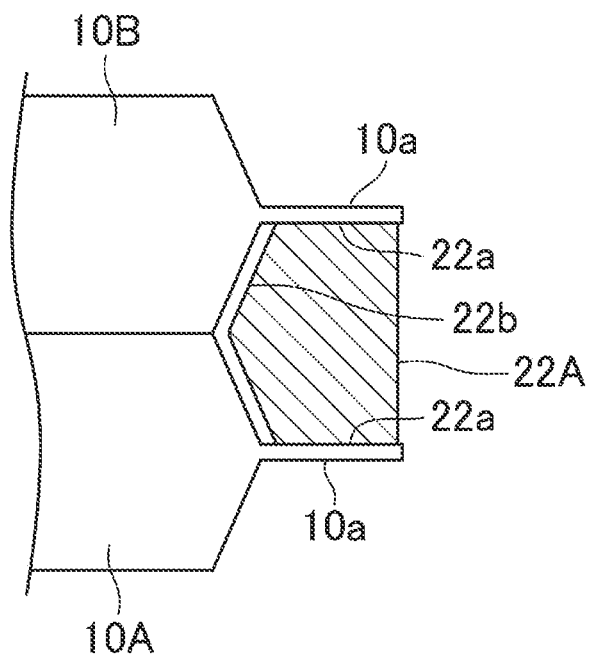
FIG. 12B is a cross-sectional view taken along the line XIIa-XIIa of FIG. 11.

FIG. 11 is a partial perspective view showing the current collector 20A sandwiched between the exposures 10a and 10a of the electrode bodies 10A and 10B. FIGS. 12A and 12B are a cross-sectional perspective view and a cross-sectional view, respectively, taken along the line XIIa-XIIa of FIG. 11.

As shown in FIG. 12B, the second connector 22A abuts on the exposures 10a and 10a of the electrode bodies 10A and 10B on the first side surfaces 22a and 22a. As shown in FIG. 1, in the joint area 24 including the abutting planes, the exposures 10a and 10a and the second connector 22A are joined by laser welding, for example.

Figure 13:
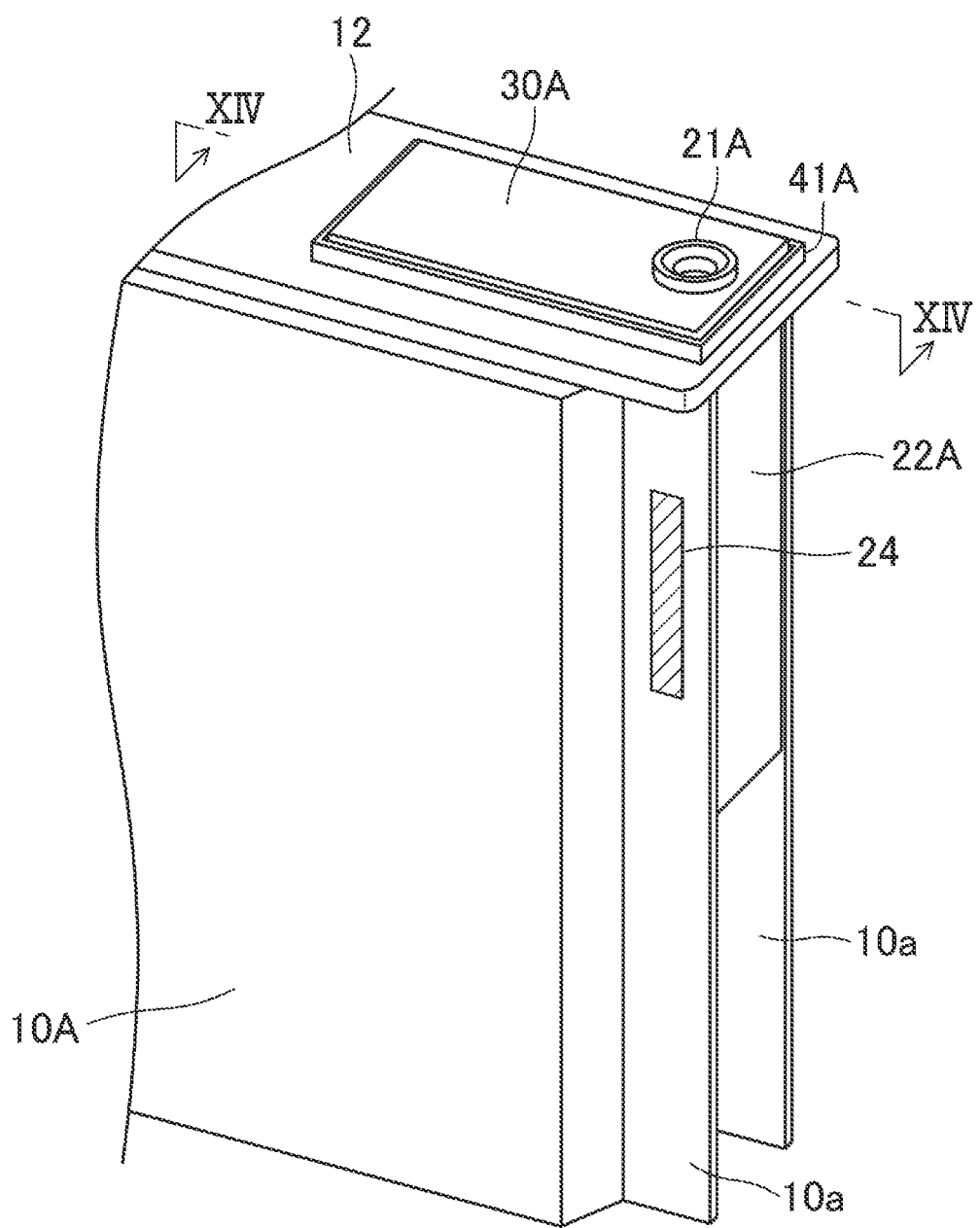
FIG. 13 is a partial perspective view showing a state after crimping a tip of a first connector of the current collector according to the first variation.
Figure 14:
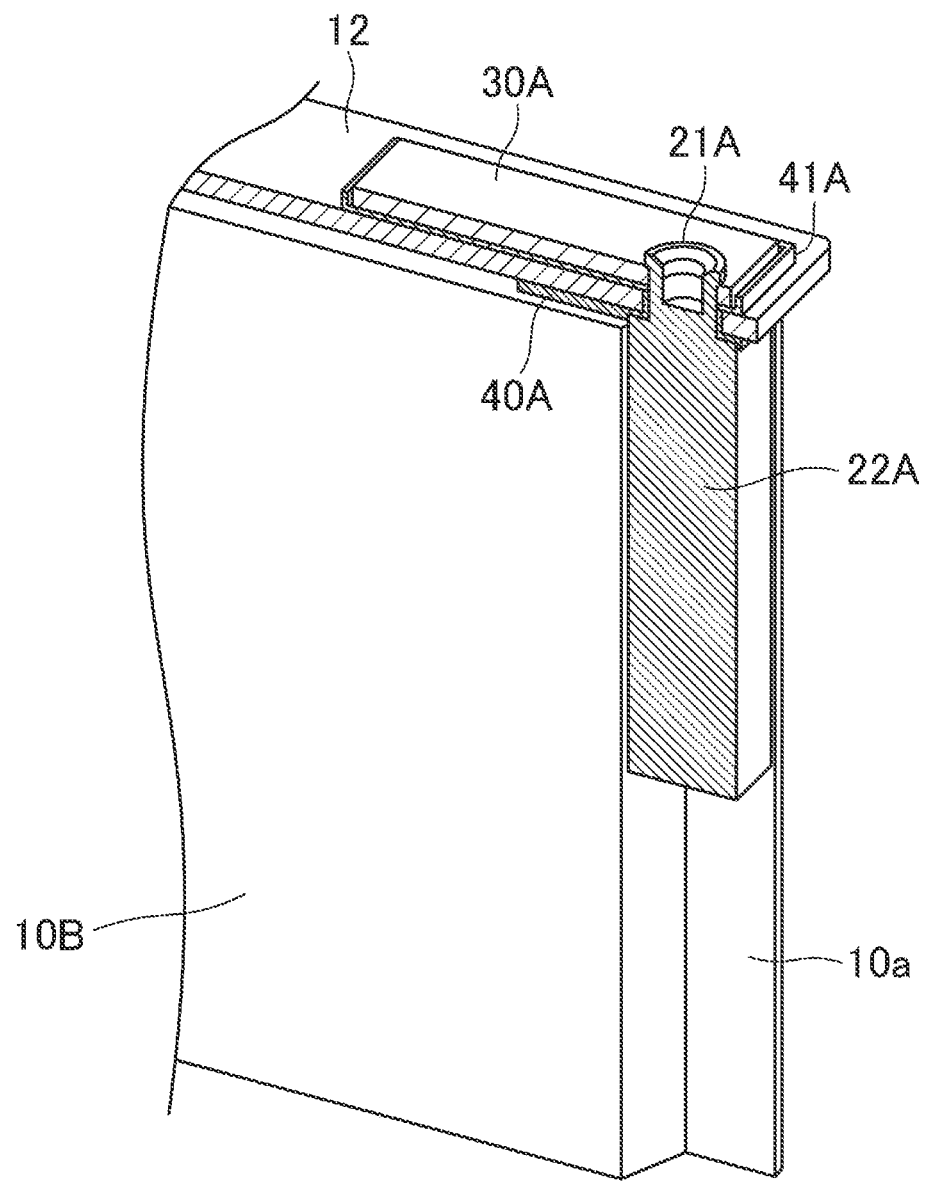
FIG. 14 is a cross-sectional perspective view taken along the line XIV-XIV of FIG. 13.

Like FIG. 6, FIG. 13 is a partial perspective view showing a state after causing the first connector 21A of the current collector 20A to penetrate the through-holes of the first insulating member 40A, the sealing plate 12, the second insulating member 41A, and the external terminal 30A, and crimping the tip of the first connector 21A projecting through the through-hole 30a of the external terminal 30A. FIG. 14 is a cross-sectional perspective view taken along the line XIV-XIV of FIG. 13.

As shown in FIGS. 13 and 14, the tip of the first connector 21A is crimped to connect the first connector 21A to the external terminal 30A and to fix the current collector 20A and the external terminal 30A to the sealing plate 12. In addition, the first insulating member 40A inside the sealing plate 12 is pressed by the upper surface 22c of the second connector 22A facing the first connector 21A so as to be fixed to the sealing plate 12.

In the first variation, the second connector 22A of the current collector 20A is in the shape of a block and thus has a larger cross section. Accordingly, the second connector 22A has a lower electrical resistance to generate less Joule heat even if a large current flows through the current collector 20A. This results in less temperature rise inside the battery.

Second Variation

Figure 15:
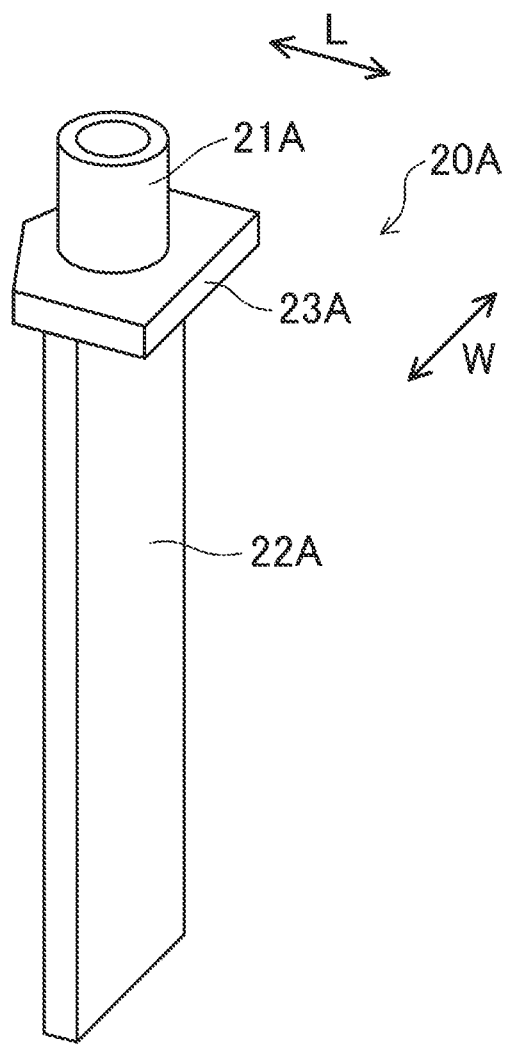
FIG. 15 is a perspective view schematically showing a configuration of a current collector according to a second variation.

FIG. 15 is a perspective view schematically showing a configuration of the current collector 20A according to a second variation.

As shown in FIG. 15, in this second variation, the first connector 21A of the current collector 20A is in the shape of a cylinder, and the second connector 22A is in the shape of a plate parallel to the width direction W of the sealing plate 12. The second connector 22A has, at the first connector 21A, an end having an upper plate 23A parallel to the sealing plate 12.

Figure 16:
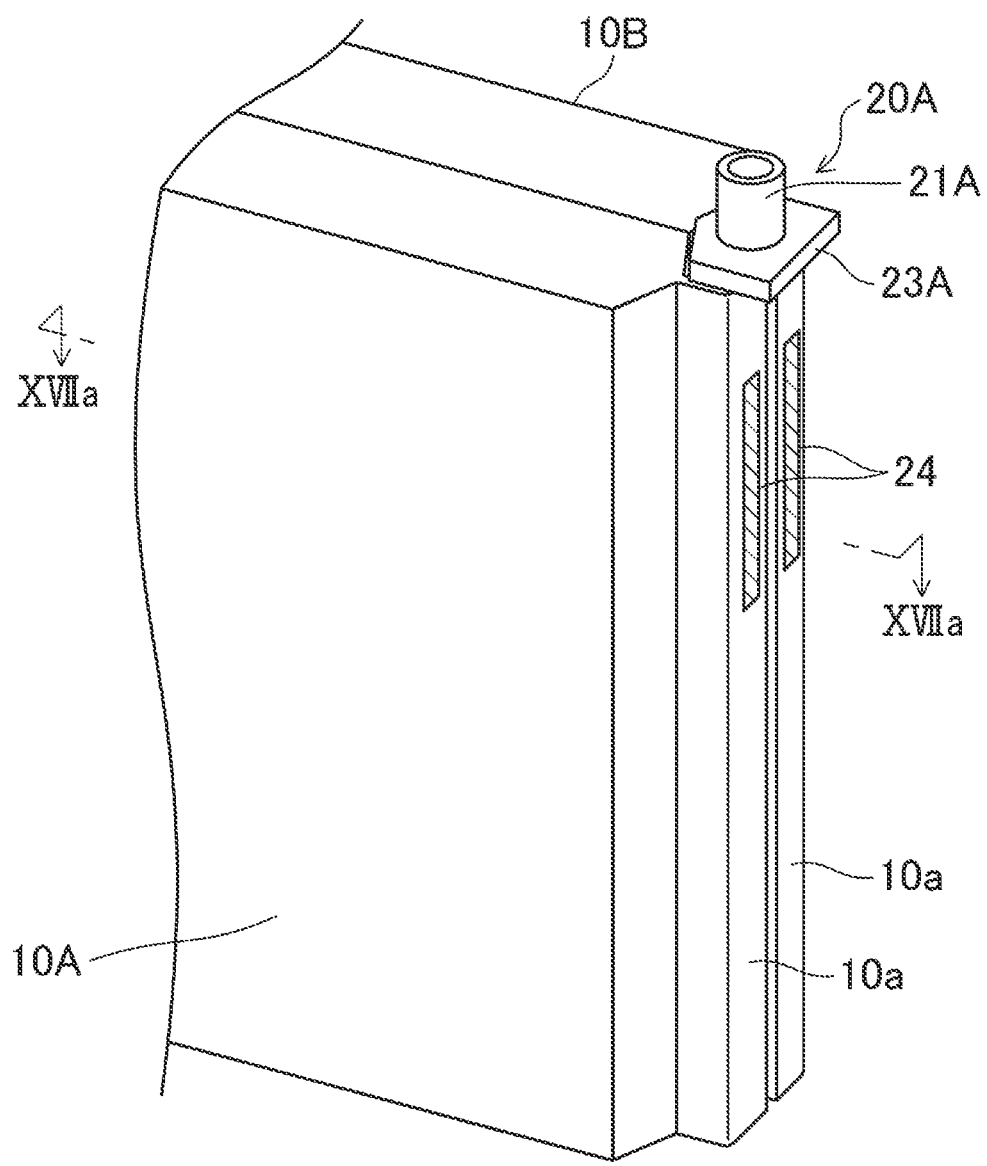
FIG. 16 is a partial perspective view showing the current collector sandwiched between exposures of electrode bodies according to the second variation.
Figure 17A:
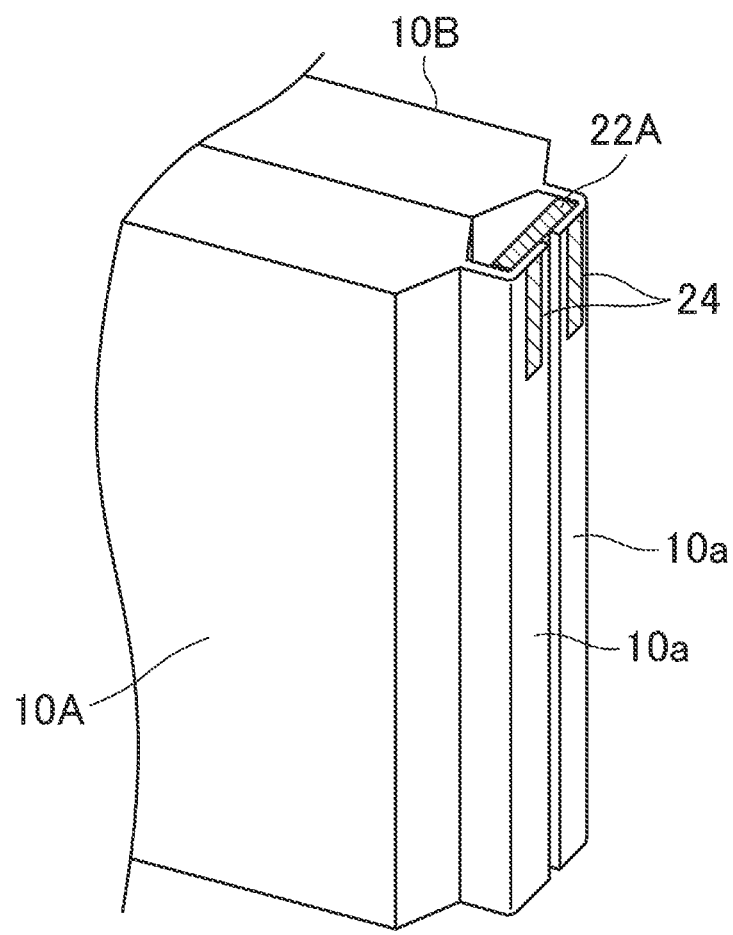
FIG. 17A is a cross-sectional perspective view taken along the line XVIIa-XVIIa of FIG. 16.
Figure 17B:
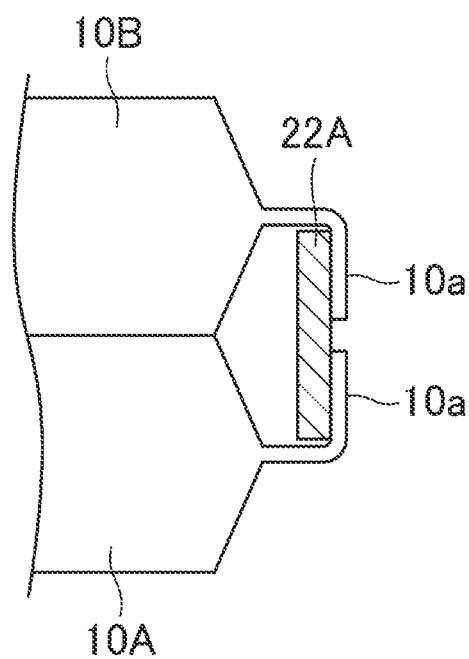
FIG. 17B is a cross-sectional view taken along the line XVIIa-XVIIa of FIG. 16.

FIG. 16 is a partial perspective view showing the current collector 20A sandwiched between the electrode bodies 10A and 10B. FIGS. 17A and 17B are a cross-sectional perspective view and a cross-sectional view, respectively, taken along the line XVIIb-XVIIb of FIG. 16.

As shown in FIG. 17B, the exposures 10a and 10a of the electrode bodies 10A and 10B are bent in the width direction of the sealing plate 12 so as to abut on the side surface of the second connector 22A parallel to the width direction W of the sealing plate 12. As shown in FIG. 16, in the joint area 24 including the abutting planes, the exposures 10a and 10a and the second connector 22A are joined by laser welding, for example.

Figure 18:
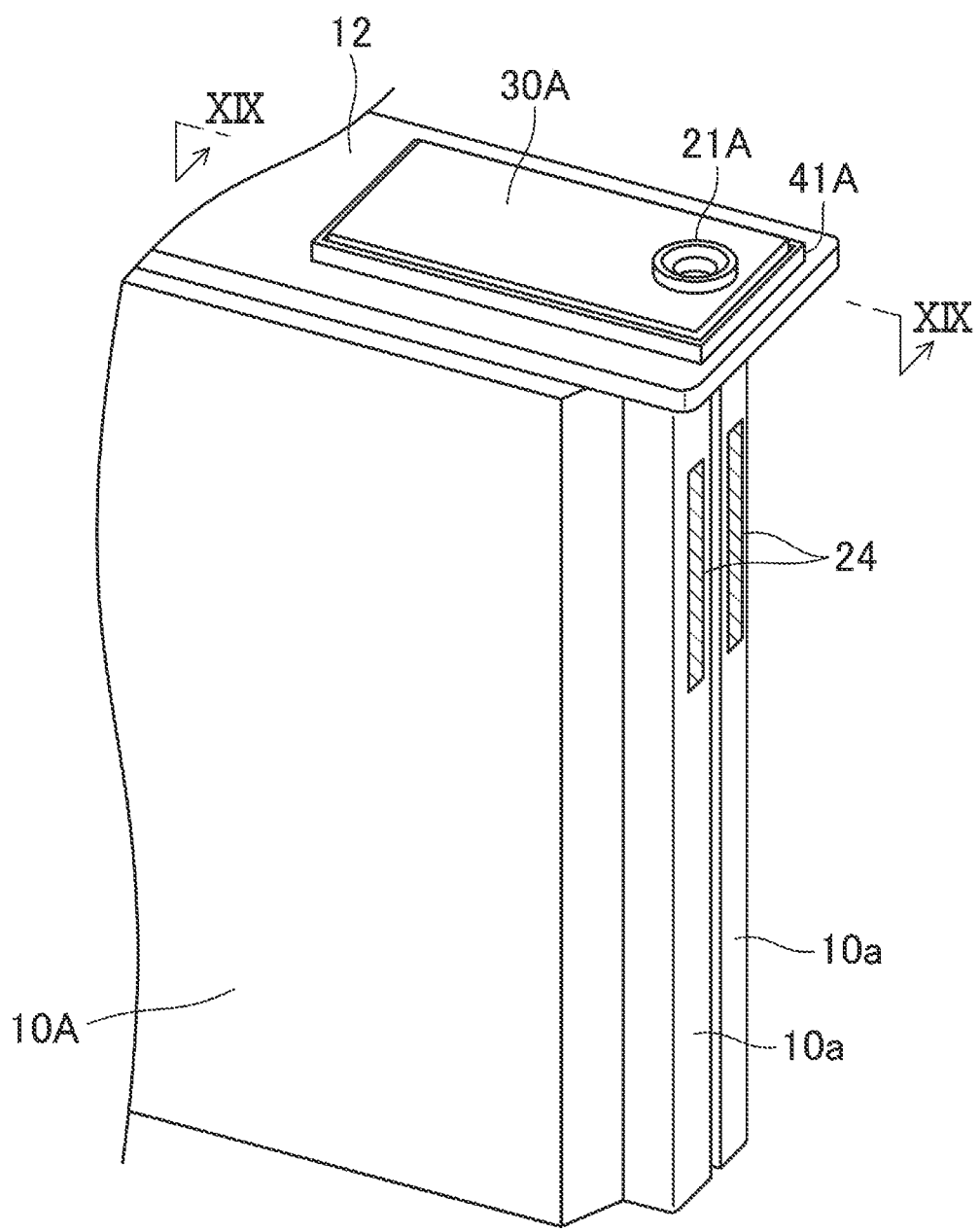
FIG. 18 is a partial perspective view showing a state after crimping a tip of a first connector of the current collector according to the second variation.
Figure 19:
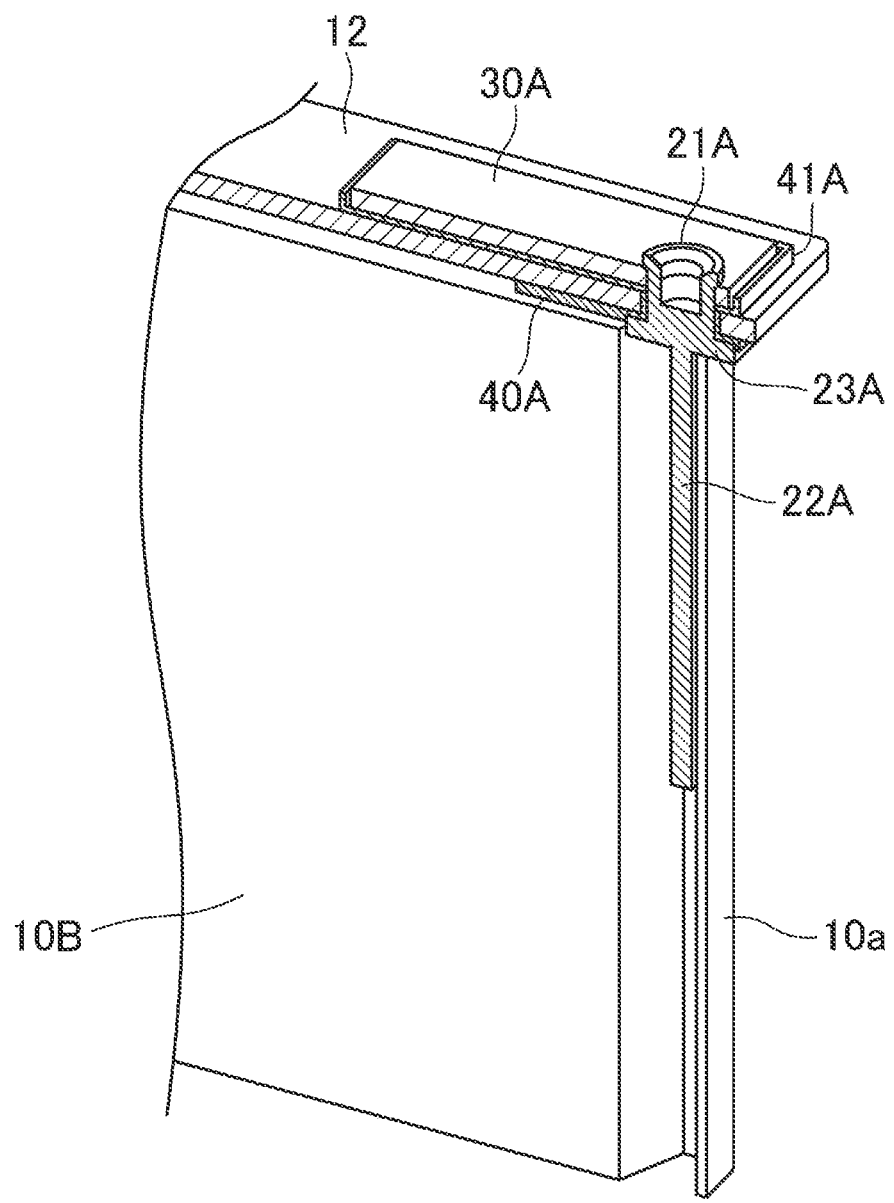
FIG. 19 is a cross-sectional perspective view taken along the line XIX-XIX of FIG. 18.

Like FIG. 6, FIG. 18 is a partial perspective view showing a state after causing the first connector 21A of the current collector 20A to penetrate the through-holes of the first insulating member 40A, the sealing plate 12, the second insulating member 41A, and the external terminal 30A, and crimping the tip of the first connector 21A projecting through the through-hole 30a of the external terminal 30A. FIG. 19 is a cross-sectional perspective view taken along the line XIX-XIX of FIG. 18.

As shown in FIGS. 18 and 19, the tip of the first connector 21A is crimped to connect the first connector 21A to the external terminal 30A and to fix the current collector 20A and the external terminal 30A to the sealing plate 12. In addition, the first insulating member 40A inside the sealing plate 12 is pressed by the upper plate 23A of the second connector 22A so as to be fixed to the sealing plate 12.

Third Variation

Figure 20:
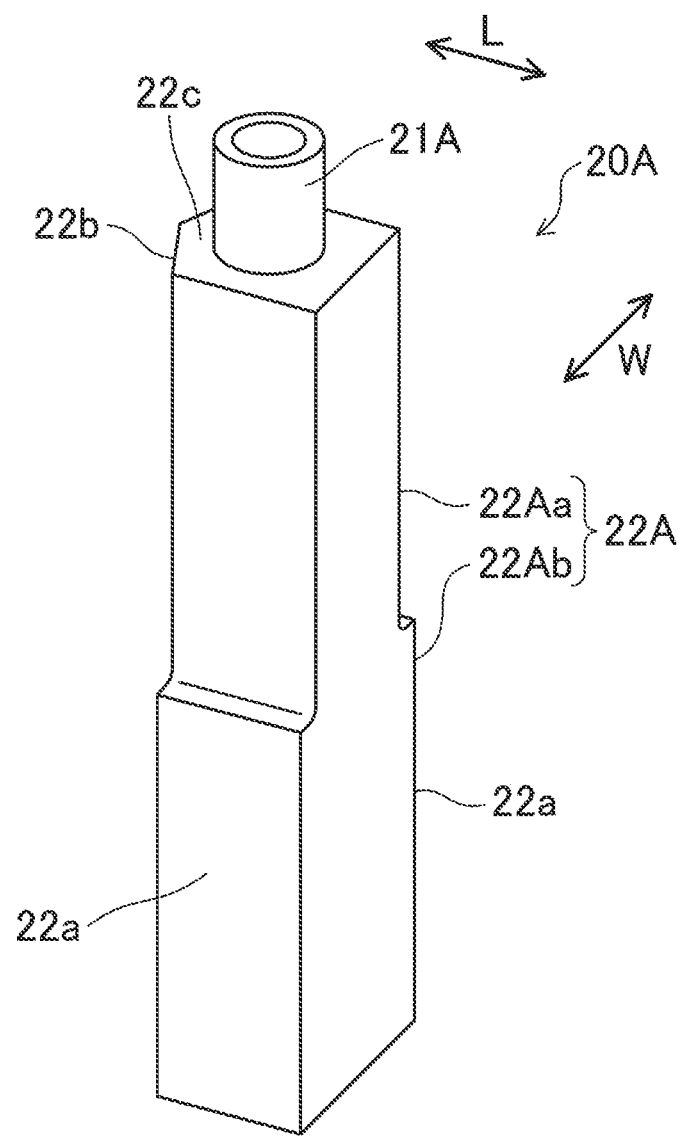
FIG. 20 is a perspective view schematically showing a configuration of a current collector according to a third variation.

FIG. 20 is a perspective view schematically showing a configuration of the current collector 20A according to a third variation.

In the embodiment described above, each of the electrode bodies 10A and 10B has a structure obtained by stacking the positive and negative electrode plates with the separator interposed therebetween. Alternatively, the positive and negative electrode plates may be wound with a separator interposed therebetween. The current collector 20A according to the third variation has a configuration suitable for the electrode bodies 10A and 10B with the wound structure.

As shown in FIG. 20, in this third variation, the first connector 21A of the current collector 20A is in the shape of a cylinder, and the second connector 22A is in the shape of a block including first and second portions 22Aa and 22Ab with different thicknesses.

The second portion 22Ab has the first side surfaces 22a parallel to the longitudinal direction L of the sealing plate 12. The first and second portions 22Aa and 22Ab have the second side surface 22b parallel to the width direction W of the sealing plate 12. The first portion 22Aa has, at the first connector 21A, an end having the upper surface 22c parallel to the sealing plate 12.

Figure 21:
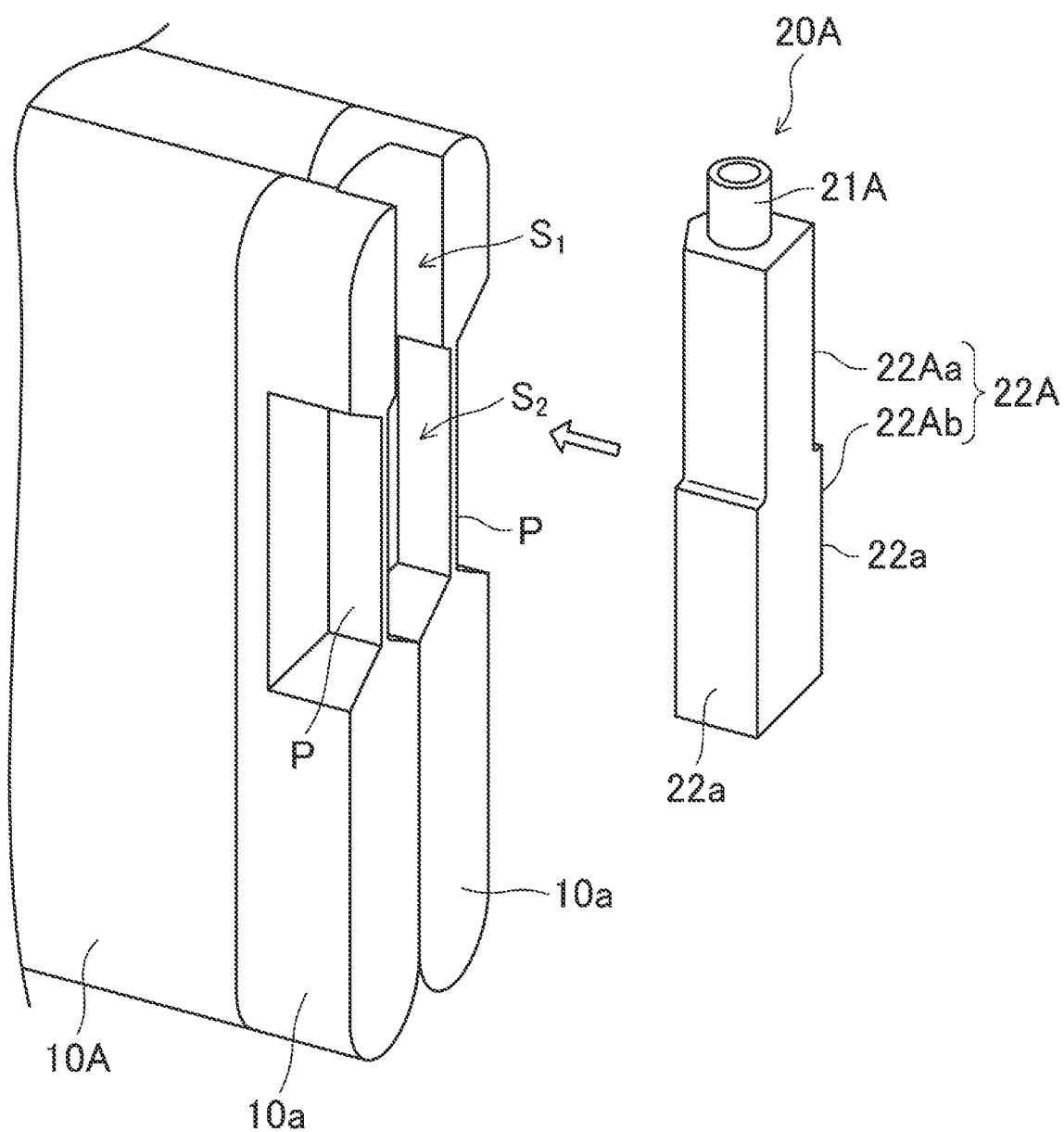
FIG. 21 is a perspective view showing the current collector inserted between two electrode bodies according to the third variation.

FIG. 21 is a perspective view showing two electrode bodies 10A and 10B arranged side by side with the current collector 20A shown in FIG. 20 inserted therebetween along the arrow.

Each of the electrode bodies 10A and 10B has a structure obtained by stacking a positive electrode plate and a negative electrode plate with a separator (none of them are shown) interposed therebetween, and have a plurality of exposures 10a at the end of the winding axis. While being bundled, the exposures 10a are compressed at certain areas P in the direction perpendicular to the winding axis. There is a constant gap $S_1$ between the two exposures 10a and 10a on one side (e.g., the upper side in FIG. 21) with the area P interposed therebetween. The two exposures 10a and 10a on the other side (e.g., the lower side in FIG. 21) abut on each other. Interposed between the two exposures 10a and 10a in the areas P is a certain gap $S_2$ larger than the gap $S_1$.

Figure 22:
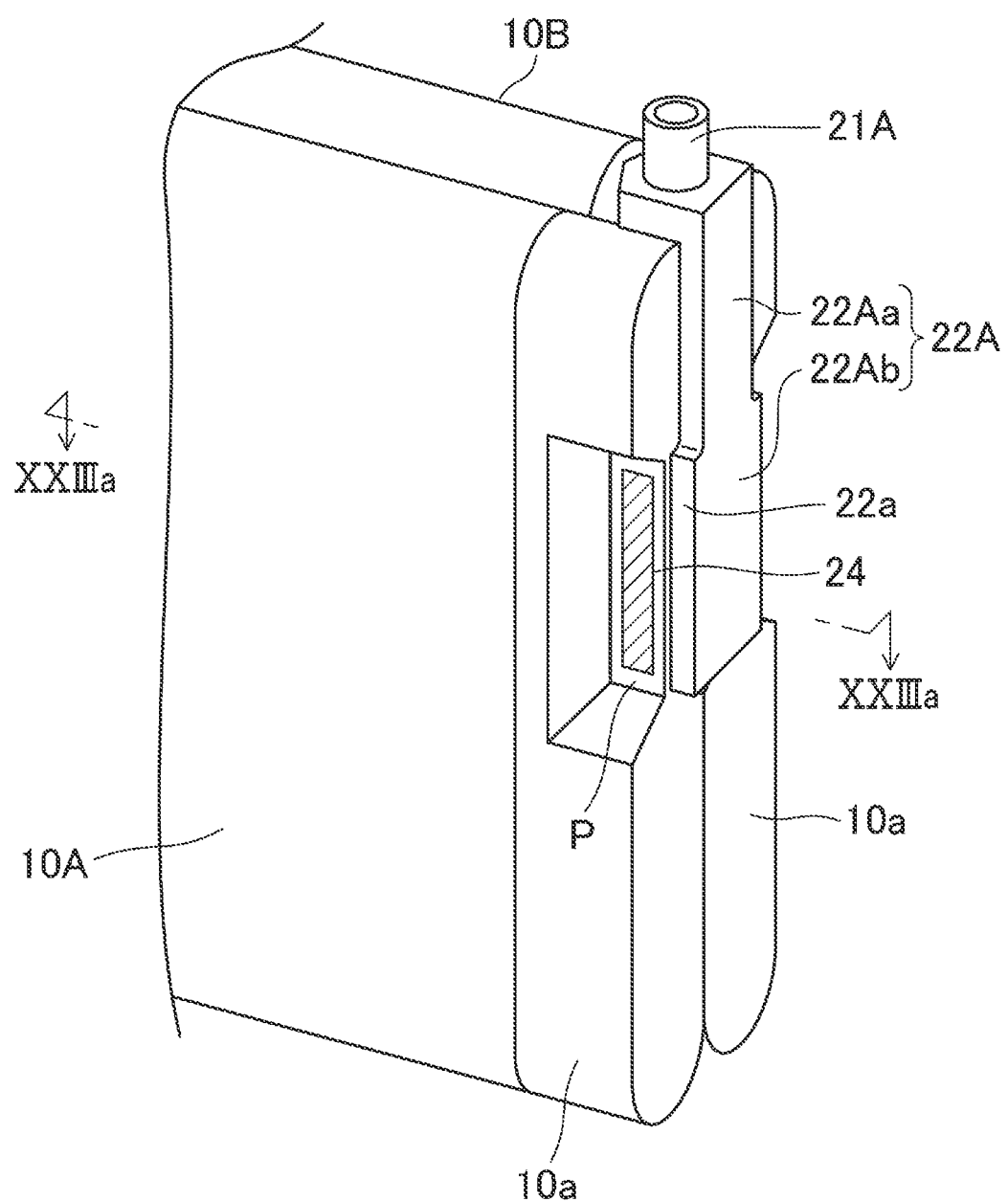
FIG. 22 is a partial perspective view showing the current collector sandwiched between exposures of electrode bodies according to the third variation.
Figure 23A:
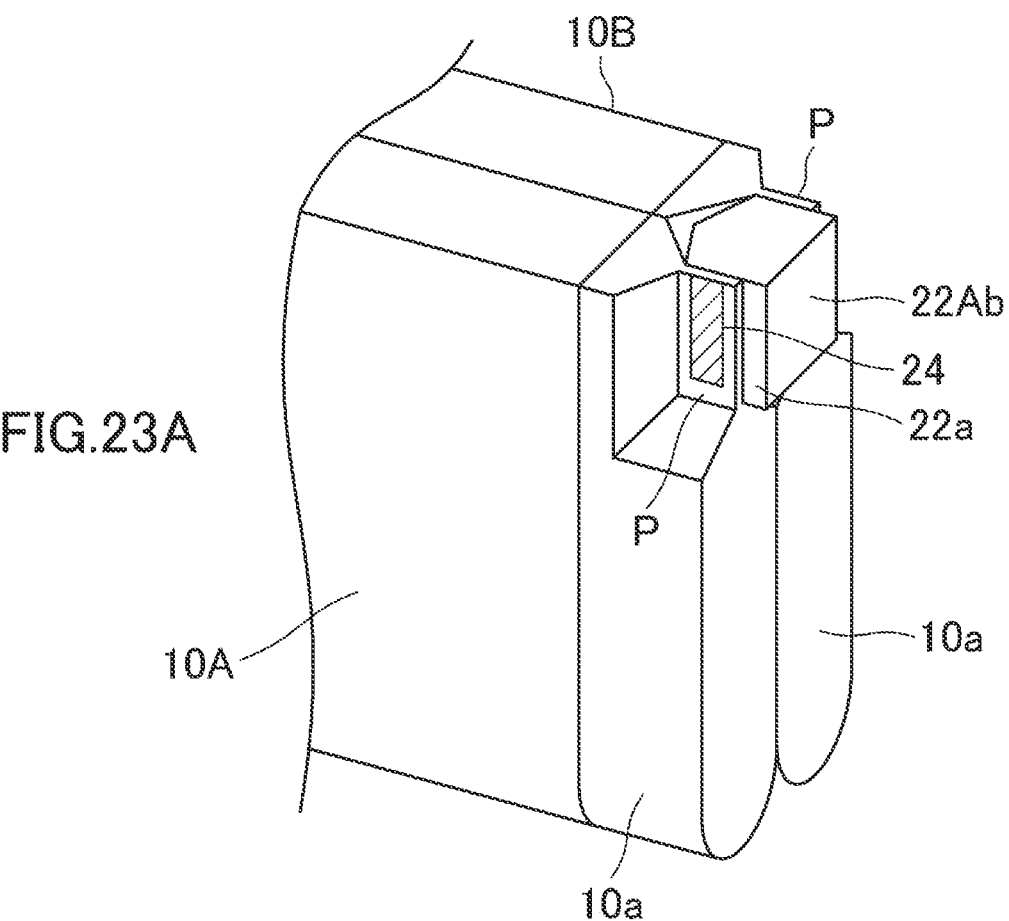
FIG. 23A is a cross-sectional perspective view taken along the line XXIIIa-XXIIIa of FIG. 22.
Figure 23B:
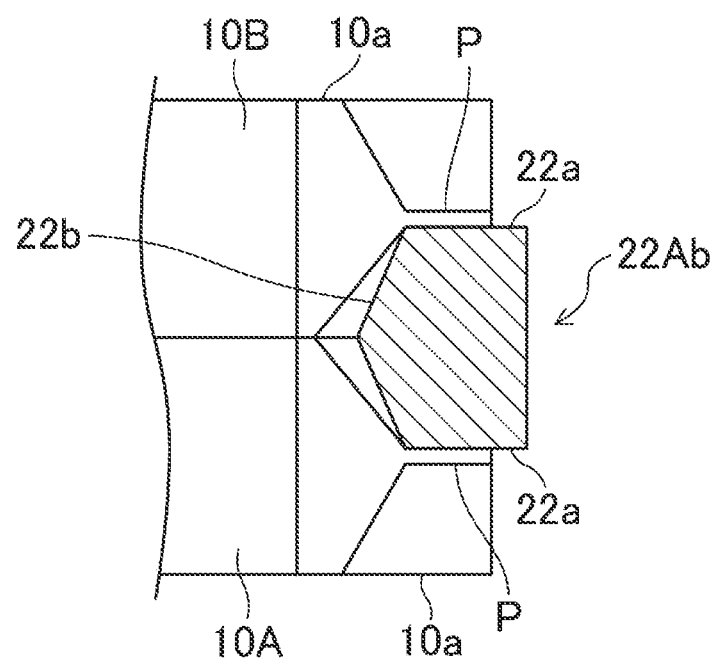
FIG. 23B is a cross-sectional view taken along the line XXIIIa-XXIIIa of FIG. 22.

FIG. 22 is a partial perspective view showing the current collector 20A sandwiched between the exposures 10a and 10a of the electrode bodies 10A and 10B. FIGS. 23A and 23B are a cross-sectional perspective view and a cross-sectional view, respectively, taken along the line XXIIIa-XXIIIa of FIG. 22.

As shown in FIG. 22, the current collector 20A includes the first and second portions 22Aa and 22Ab. The first portion 22Aa of the second connector 22A is sandwiched between the exposures 10a and 10a of the electrode bodies 10A and 10B, while being inserted into the gap $S_1$ shown in FIG. 21. The second portion 22Ab is sandwiched between the exposures 10a and 10a of the electrode bodies 10A and 10B, while being inserted into the gap $S_2$ shown in FIG. 21.

As shown in FIGS. 23A and 23B, the second portion 22Ab abuts on the exposures 10a and 10a of the electrode bodies 10A and 10B on the first side surfaces 22a and 22a. In the joint area 24 including the abutting planes, the exposures 10a and 10a and the second connector 22A are then joined by laser welding, for example.

Figure 24:
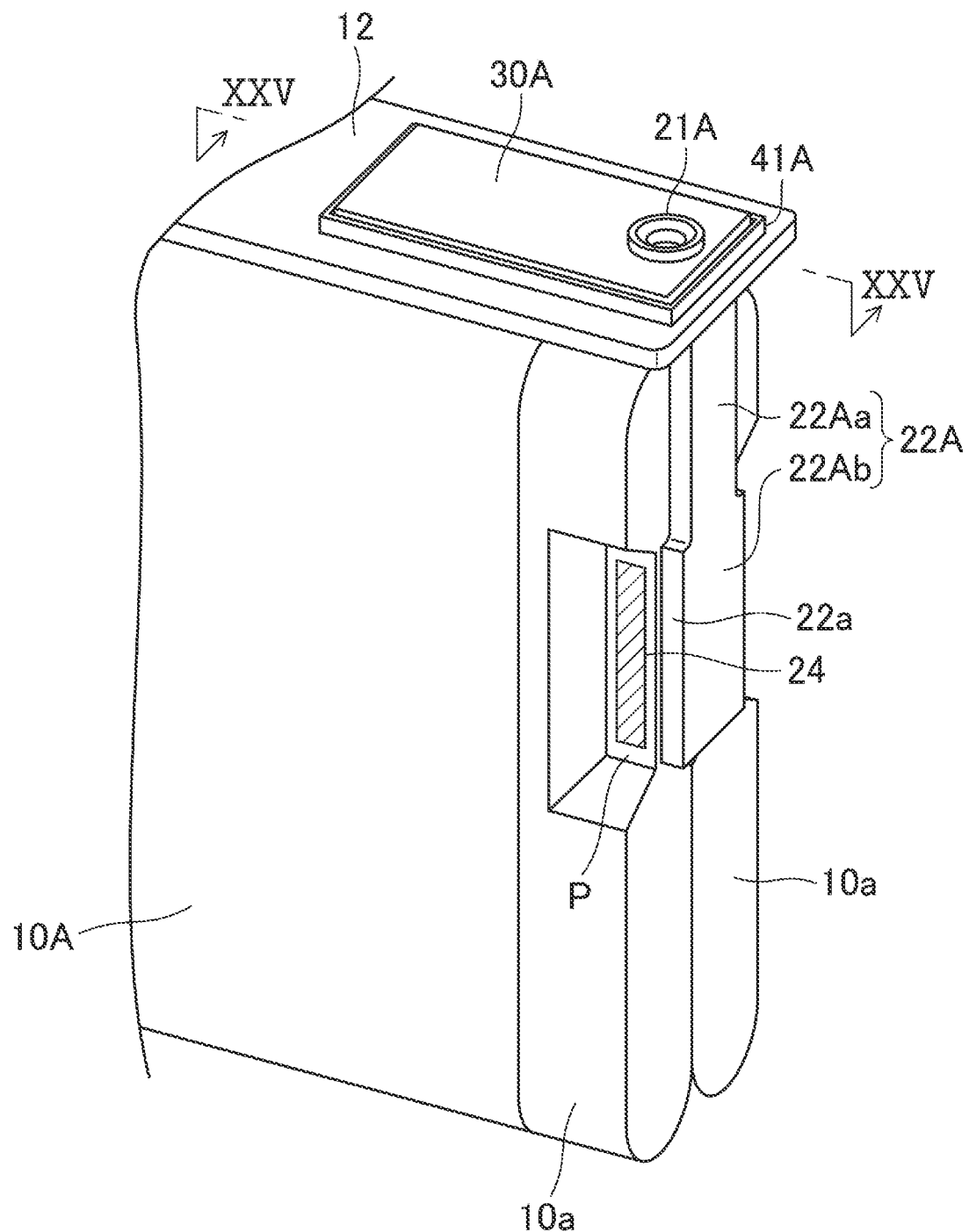
FIG. 24 is a partial perspective view showing a state after crimping a tip of a first connector of the current collector according to the third variation.
Figure 25:
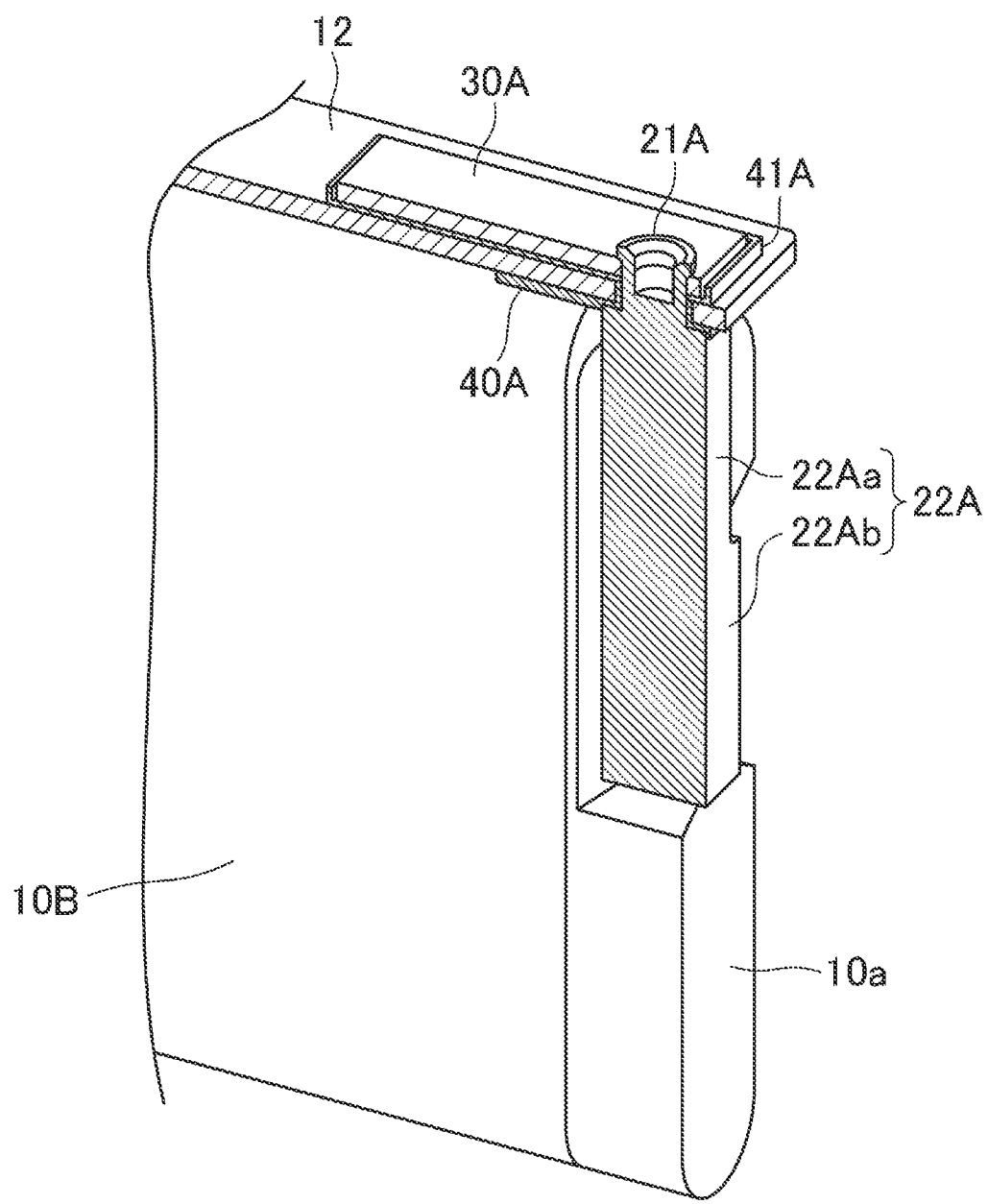
FIG. 25 is a cross-sectional perspective view taken along the line XXV-XXV of FIG. 24.

Like FIG. 6, FIG. 24 is a partial perspective view showing a state after causing the first connector 21A of the current collector 20A to penetrate the through-holes of the first insulating member 40A, the sealing plate 12, the second insulating member 41A, and the external terminal 30A, and crimping the tip of the first connector 21A projecting through the through-hole 30a of the external terminal 30A. FIG. 25 is a cross-sectional perspective view taken along the line XXV-XXV of FIG. 24.

As shown in FIGS. 24 and 25, the tip of the first connector 21A is crimped to connect the first connector 21A to the external terminal 30A and to fix the current collector 20A and the external terminal 30A to the sealing plate 12. In addition, the first insulating member 40A inside the sealing plate 12 is pressed by the upper surface 22c of the second connector 22A facing the first connector 21A so as to be fixed to the sealing plate 12.

Fourth Variation

Figure 26:
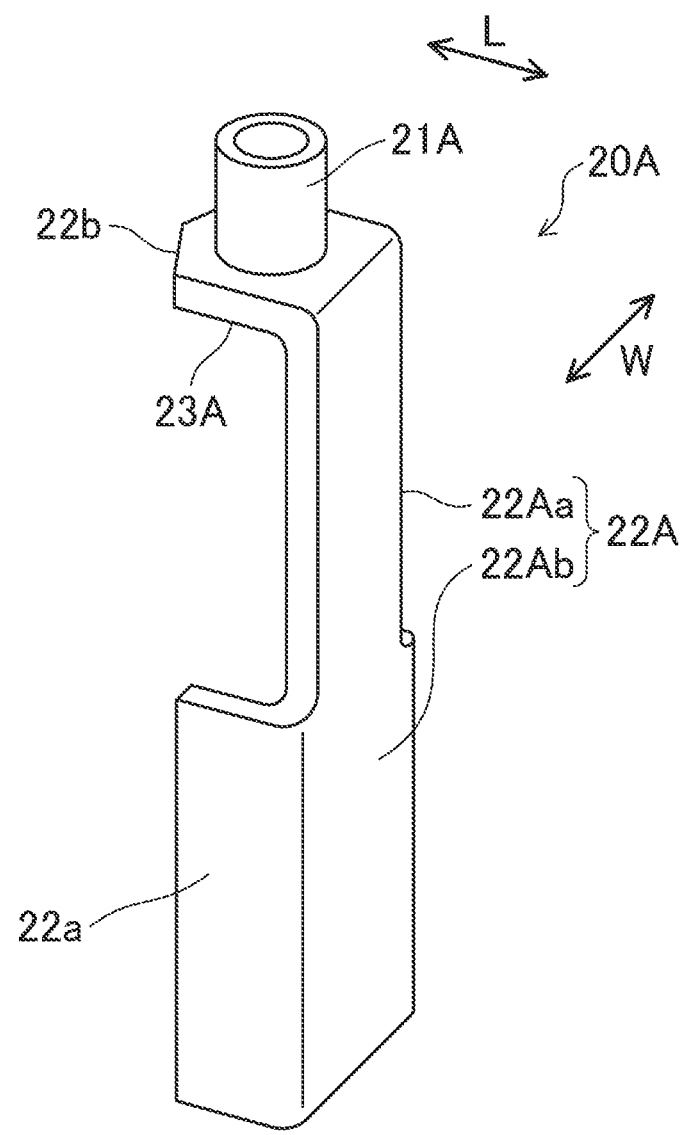
FIG. 26 is a perspective view schematically showing a configuration of a current collector according to a fourth variation.

FIG. 26 is a perspective view schematically showing a configuration of the current collector 20A according to a fourth variation.

The current collector 20A according to the fourth variation has a configuration suitable for the electrode bodies 10A and 10B with a wound structure.

As shown in FIG. 26, in this fourth variation, the first connector 21A of the current collector 20A is in the shape of a cylinder, and the second connector 22A includes a first portion 22Aa in the shape of a plate and a second portion 22Ab with a substantially U-shaped cross-section. The second connector 22A has, at the first connector 21A, an end having the upper plate 23A. The second portion 22Ab has first side surfaces 22a parallel to the longitudinal direction L of the sealing plate 12. In addition, the second connector 22A has, at the first connector 21A, an end having the upper plate 23A.

Figure 27:
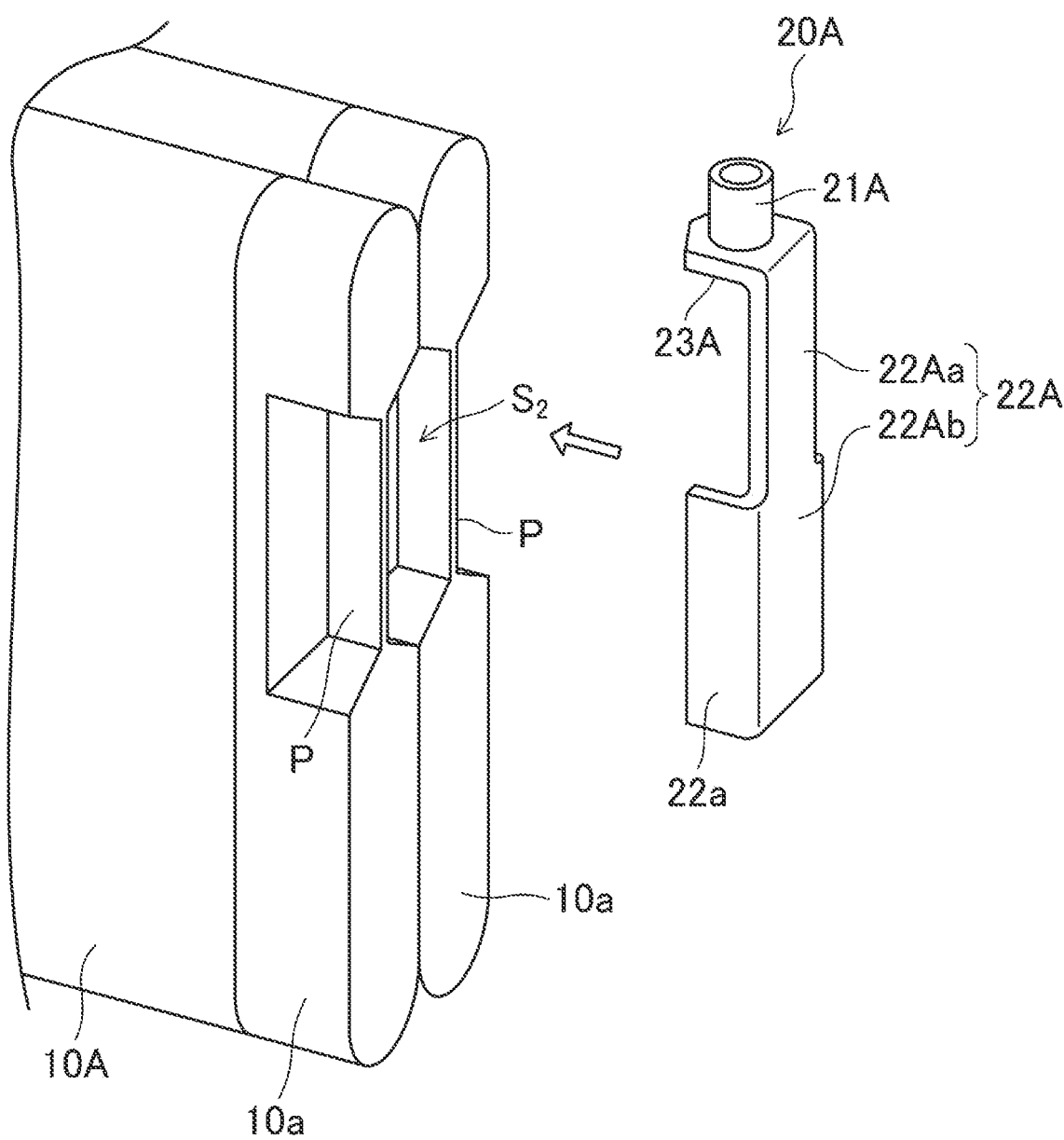
FIG. 27 is a perspective view showing the current collector inserted between two electrode bodies according to the fourth variation.

FIG. 27 is a perspective view showing two electrode bodies 10A and 10B arranged side by side with the current collector 20A shown in FIG. 26 inserted therebetween along the arrow.

Each of the electrode bodies 10A and 10B has a structure obtained by stacking a positive electrode plate and a negative electrode plate with a separator (none of them are shown) interposed therebetween, and have a plurality of exposures 10a at the end of the winding axis. While being bundled, the exposures 10a are compressed at certain areas P in the direction perpendicular to the winding axis. The two exposures 10a and 10a on the respective sides abut on each other with the area P interposed therebetween. Interposed between the two exposures 10a and 10a in the areas P is a certain gap $S_2$.

Figure 28:
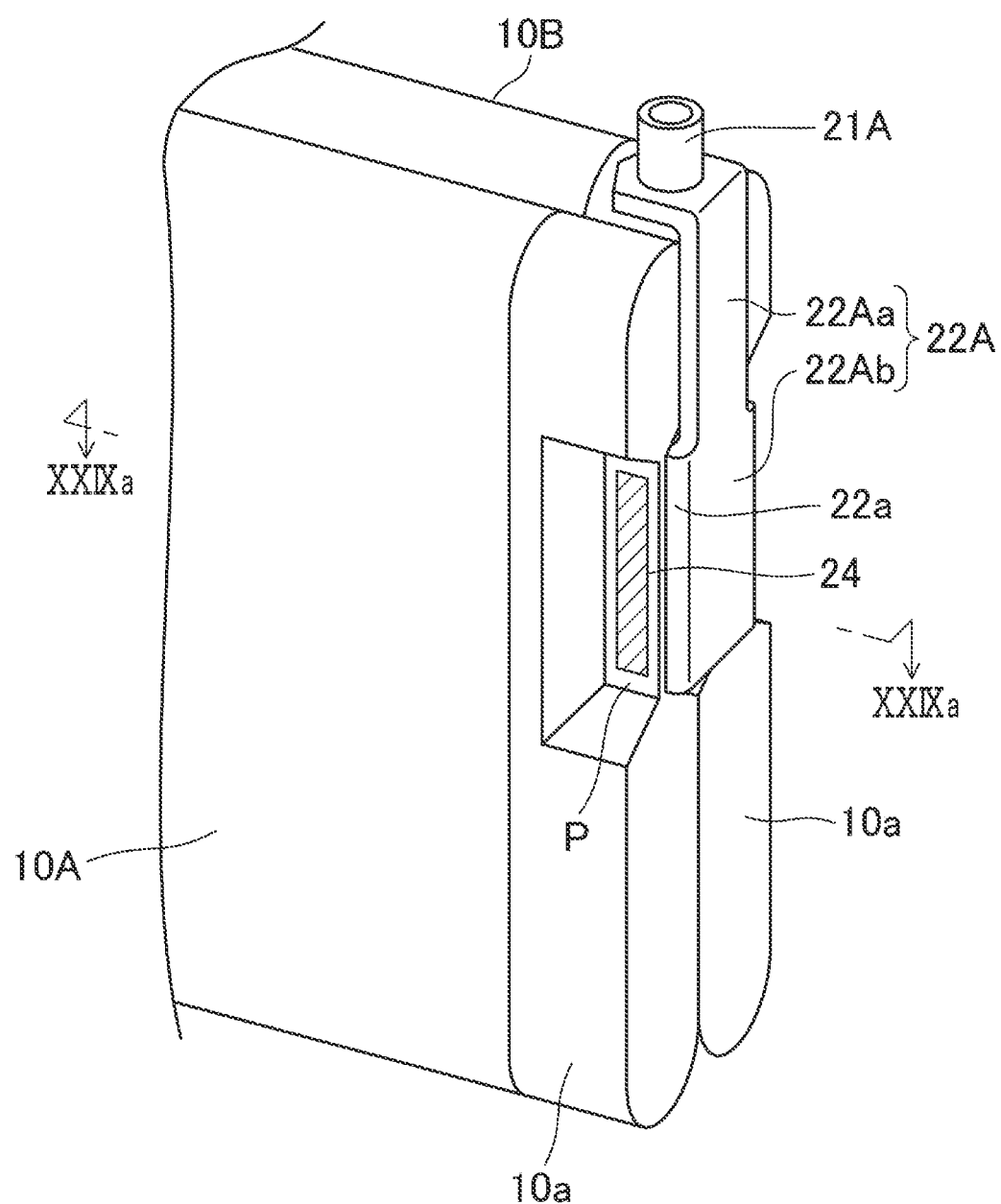
FIG. 28 is a partial perspective view showing the current collector sandwiched between exposures of electrode bodies according to the fourth variation.
Figure 29A:
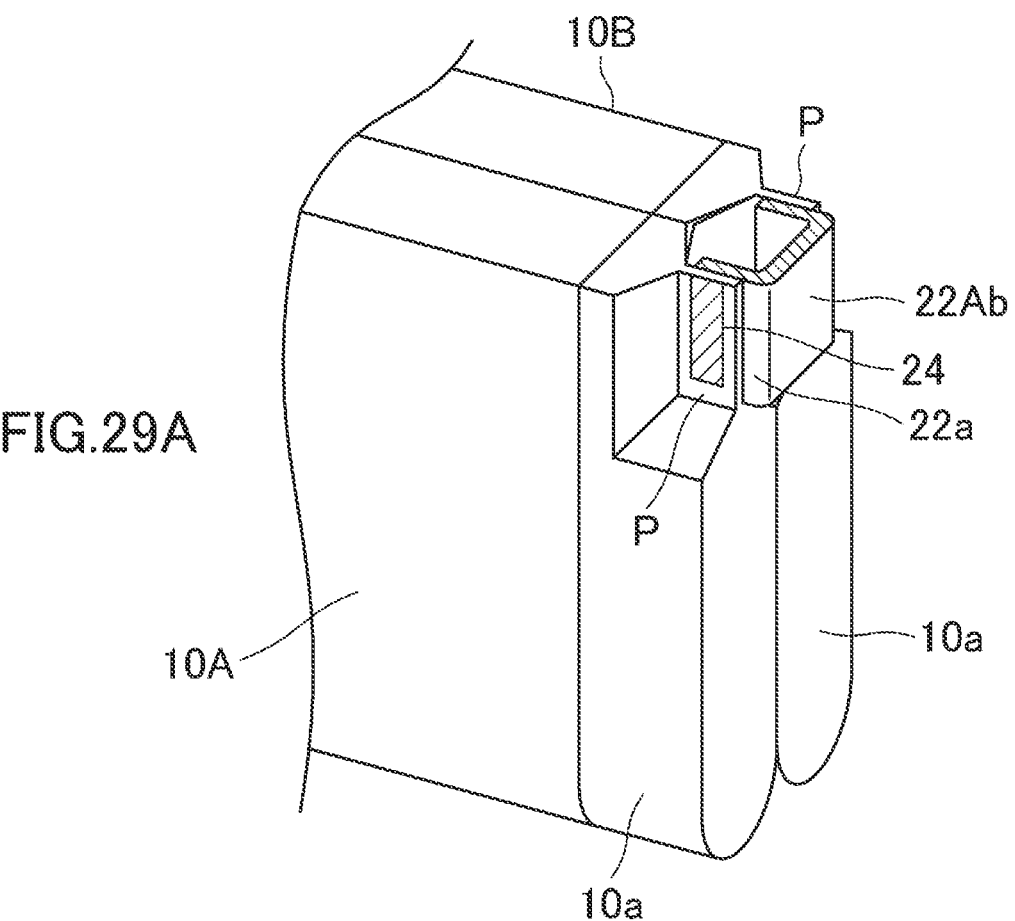
FIG. 29A is a cross-sectional perspective view taken along the line XXIXa-XXIXa of FIG. 28.
Figure 29B:
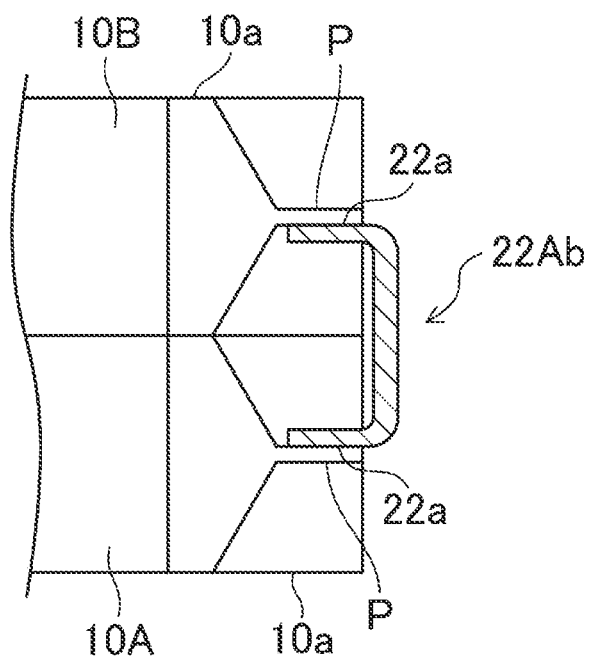
FIG. 29B is a cross-sectional view taken along the line XXIXa-XXIXa of FIG. 28.

FIG. 28 is a partial perspective view showing the current collector 20A sandwiched between the exposures 10a and 10a of the electrode bodies 10A and 10B. FIGS. 29A and 29B are a cross-sectional perspective view and a cross-sectional view, respectively, taken along the line XXIXa-XXIXa of FIG. 28.

As shown in FIG. 28, in the current collector 20A, the second portion 22Ab of the second connector 22A is sandwiched between the exposures 10a and 10a of the electrode bodies 10A and 10B, while being inserted into the gap $S_2$ shown in FIG. 27.

As shown in FIGS. 29A and 29B, the second portion 22Ab abuts on the exposures 10a and 10a of the electrode bodies 10A and 10B on the first side surfaces 22a and 22a. In the joint area 24 including the abutting planes, the exposures 10a and 10a and the second connector 22A are then joined by laser welding, for example.

Figure 30:
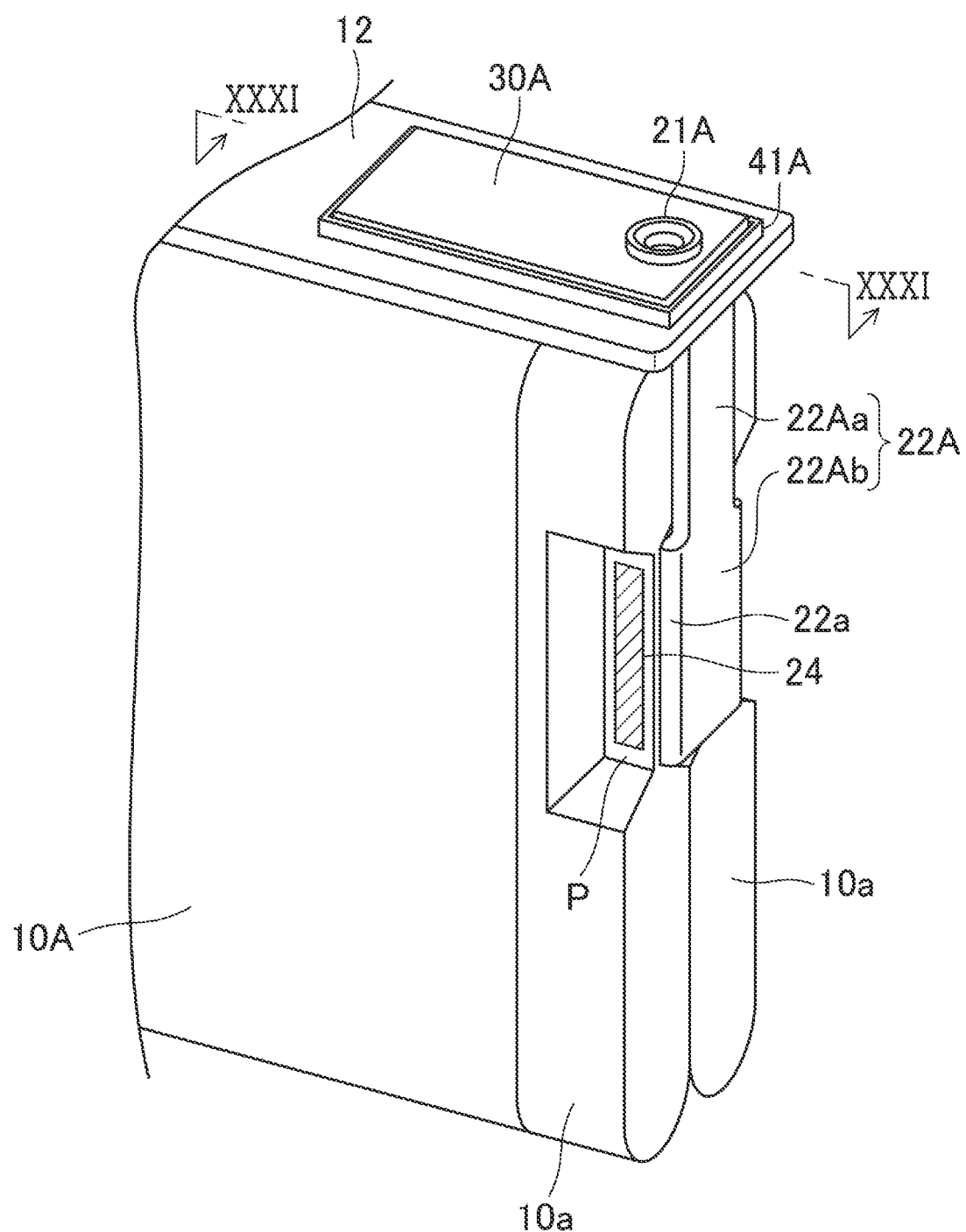
FIG. 30 is a partial perspective view showing a state after crimping a tip of a first connector of the current collector according to the fourth variation.
Figure 31:
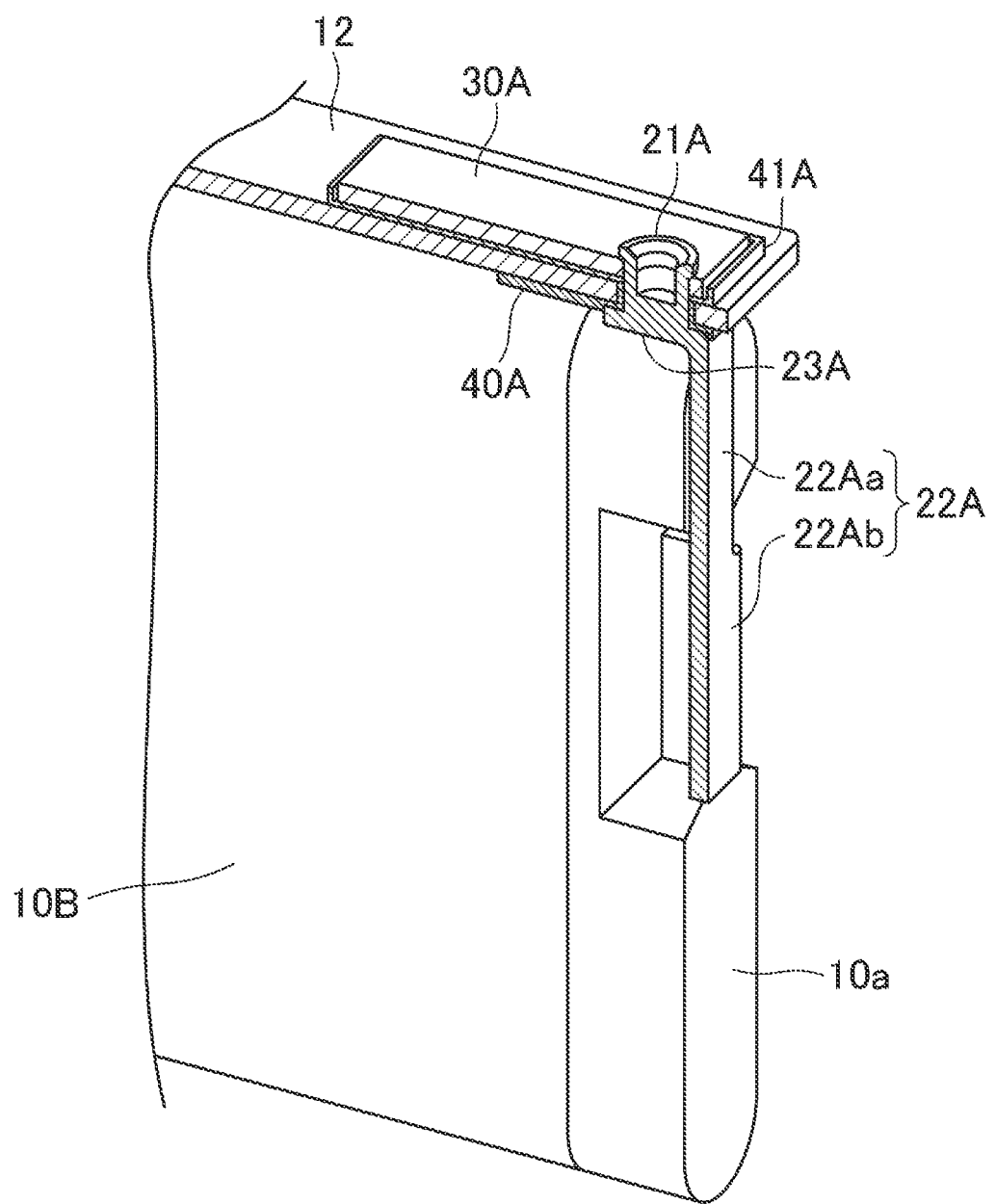
FIG. 31 is a cross-sectional perspective view taken along the line XXXI-XXXI of FIG. 30.

Like FIG. 6, FIG. 30 is a partial perspective view showing a state after causing the first connector 21A of the current collector 20A to penetrate the through-holes of the first insulating member 40A, the sealing plate 12, the second insulating member 41A, and the external terminal 30A, and crimping the tip of the first connector 21A projecting through the through-hole 30a of the external terminal 30A. FIG. 31 is a cross-sectional perspective view taken along the line XXXI-XXXI of FIG. 30.

As shown in FIGS. 30 and 31, the tip of the first connector 21A is crimped to connect the first connector 21A to the external terminal 30A and to fix the current collector 20A and the external terminal 30A to the sealing plate 12. In addition, the first insulating member 40A inside the sealing plate 12 is pressed by the upper plate 23A of the second connector 22A so as to be fixed to the sealing plate 12.

While the present disclosure has been described with reference to preferred embodiments, such description is not limiting, and various modifications may be made.

Figure 32A:
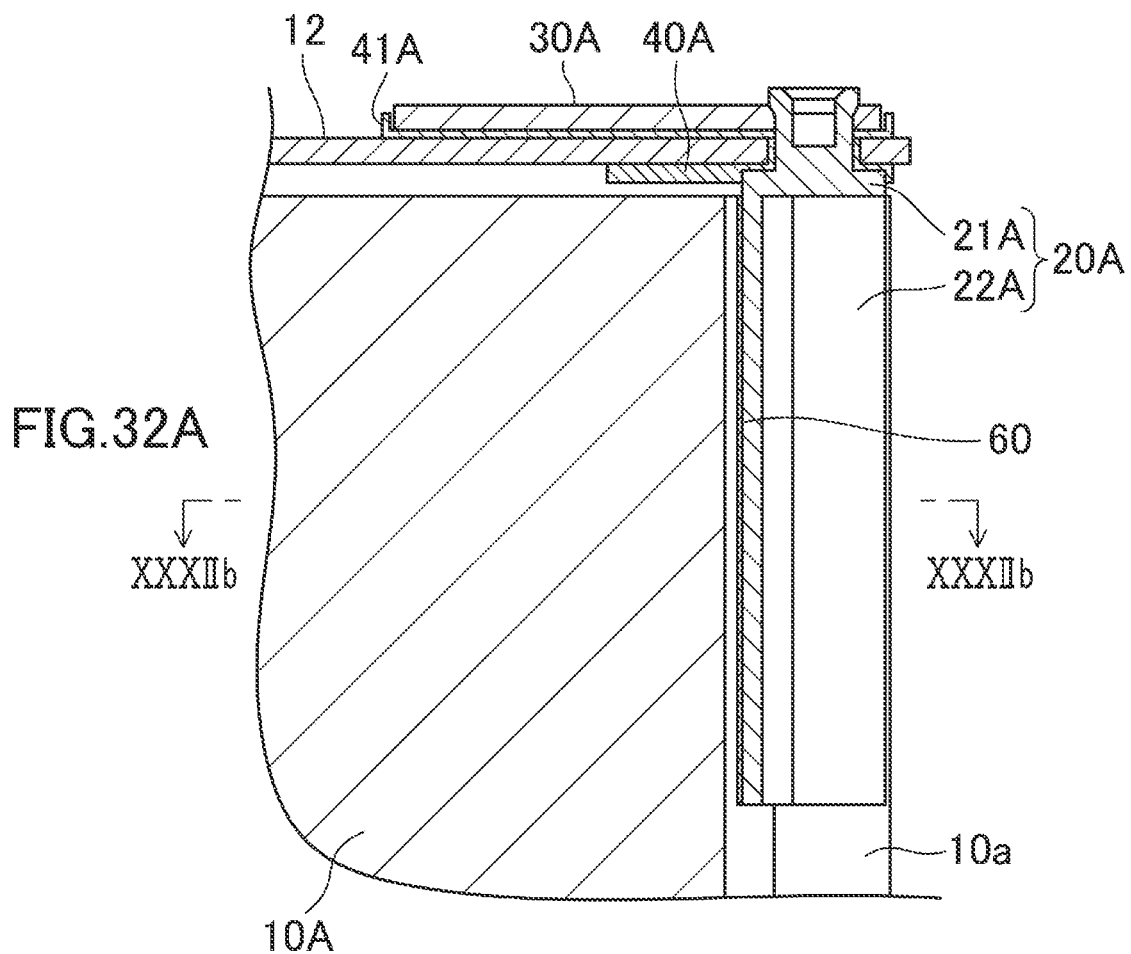
FIG. 32A shows a configuration of a current collector according to another embodiment, and is an enlarged partial cross-sectional view near a positive electrode external terminal.
Figure 32B:
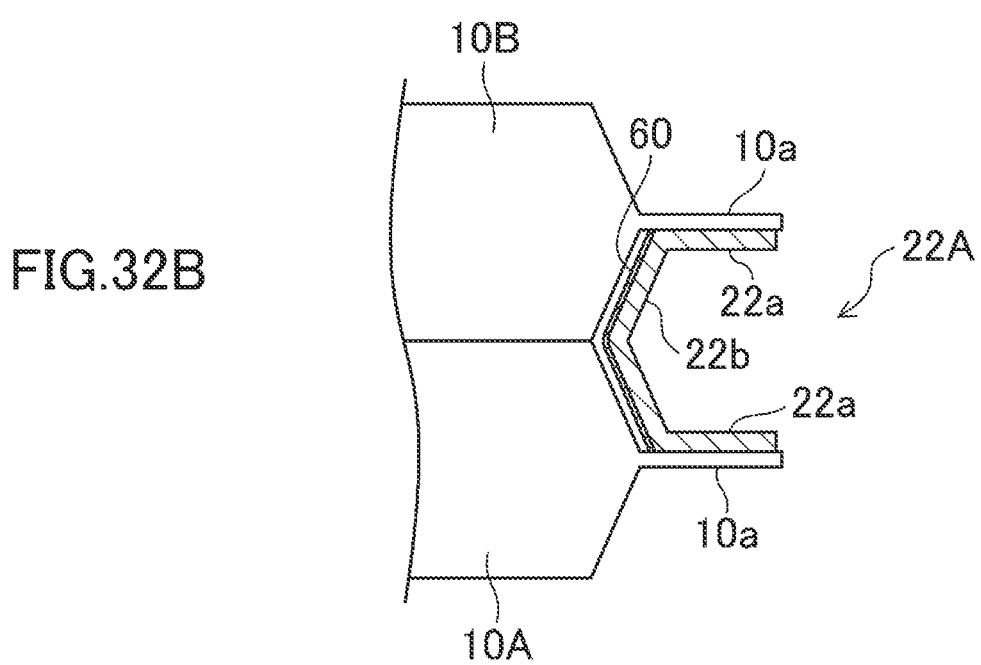
FIG. 32B is a cross-sectional view taken along the line XXXIIb-XXXIIb of FIG. 32A.

For example, if the current collector 20A has the structure illustrated in FIG. 2, an insulating member 60 may be placed on the second side surface 22b of the second connector 22A facing the electrode bodies 10A and 10B, as illustrated in FIGS. 32A and 32B. Here, FIG. 32A is an enlarged partial cross-sectional view near the positive electrode external terminal 30A. FIG. 32B is a cross-sectional view taken along the line XXXIIb-XXXIIb of FIG. 32A.

The positive electrode current collector 20A is connected to an exposure (i.e., the positive electrode core) exposed on the edge of the positive electrode plate on the first side surfaces 22a of the second connector 22A. The negative electrode plate is typically located as the outermost layer of the electrode body 10A. The second side surface 22b of the second connector 22A facing the electrode body 10A is close to the negative electrode plate as the outermost layer of the electrode body 10A. If the secondary battery receives an impact from the outside, the second side surface 22b of the second connector 22A may break through the separator and come into contact with the negative electrode as the outermost layer, which may cause an internal short circuit between the positive and negative electrode plates. To address the problem, the insulating member 60 is located on the second side surface 22b of the second connector 22A facing the electrode body 10A, which reduces such internal circuits. The insulating member 60 is an insulating tape or an insulating coating film, for example. In addition, such placement of the insulating member 60 is applicable to a current collector with a structure other than the current collector with the structure illustrated in FIG. 2.

In the embodiments described above, as shown in FIGS. 4, 11, 16, 22, and 28, the second connector 22A of the current collector 20A and the exposures 10a are welded in the joint area 24. The joint may be covered with a covering member. This reduces the metal powder generated in the welding and entering the electrode body 10A. The insulating member 60 is an insulating tape, for example.

In the embodiments described above, the two electrode bodies 10A and 10B with the same structure are arranged in the battery case 11. Alternatively, a single electrode body may be placed.

Figure 33:
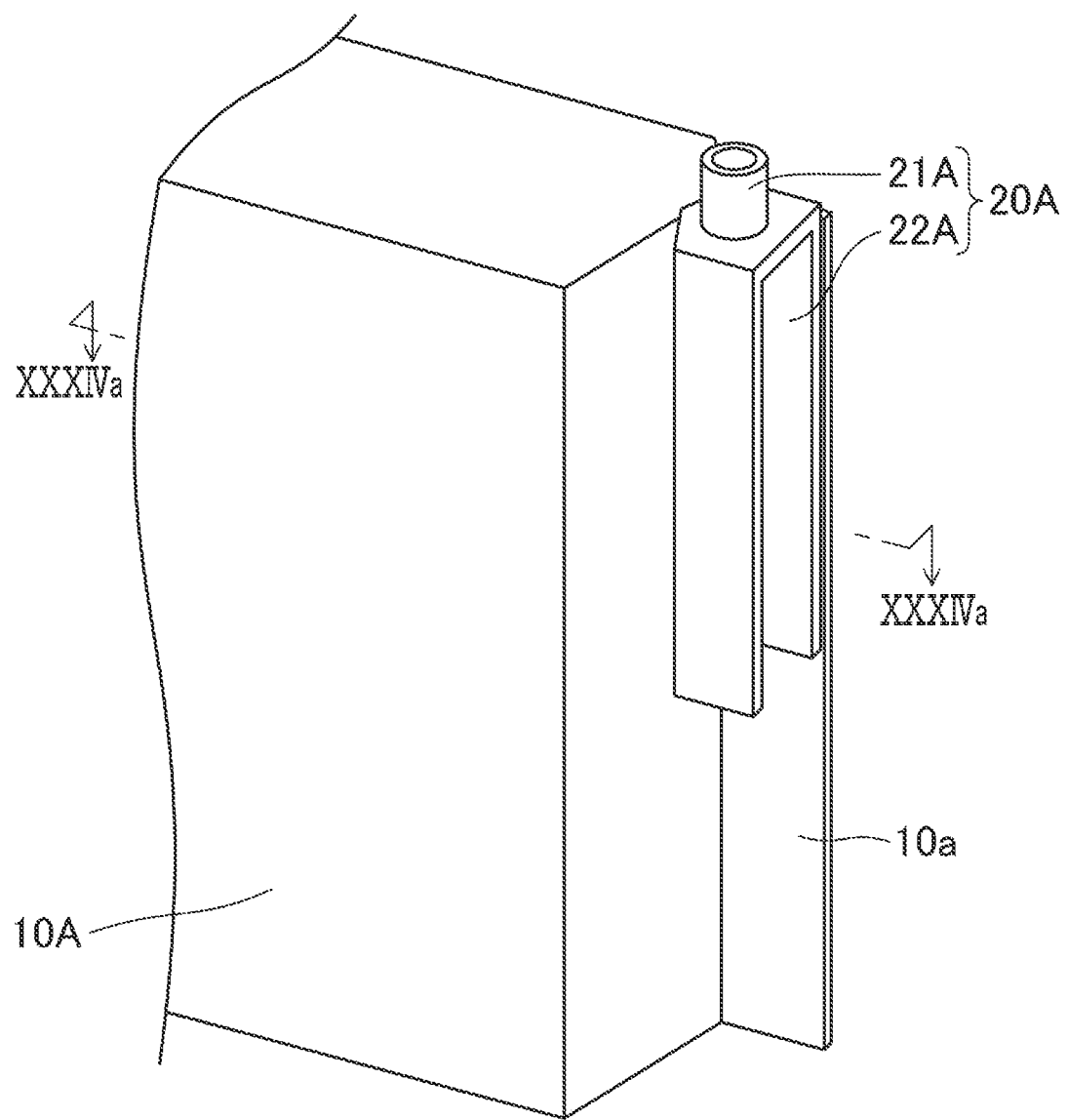
FIG. 33 is a partial perspective view showing configurations of an electrode body and a current collector according to the other embodiment.
Figure 34A:
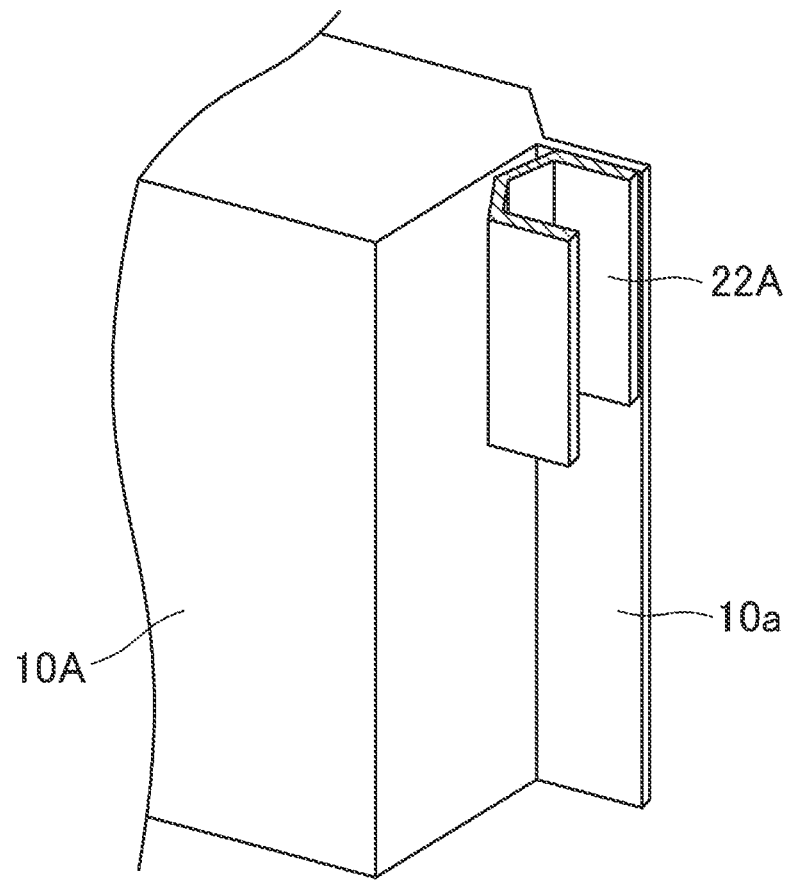
FIG. 34A is a cross-sectional perspective view taken along the line XXXIVa-XXXIVa of FIG. 33.
Figure 34B:
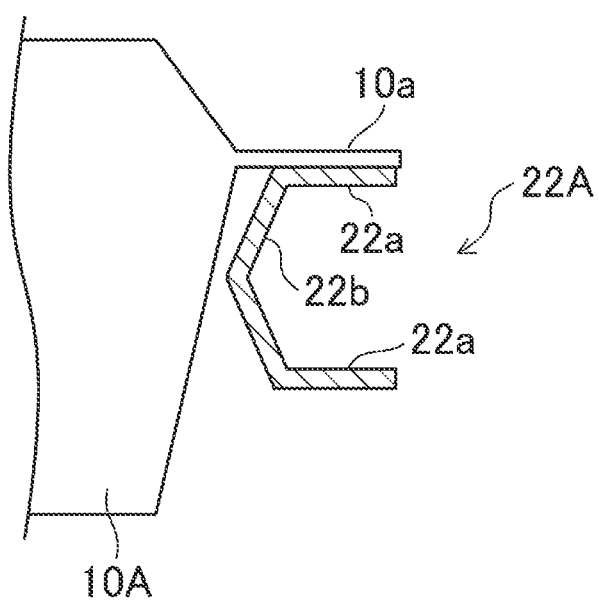
FIG. 34B is a cross-sectional view taken along the line XXXIVa-XXXIVa of FIG. 33.

FIG. 33 is a partial perspective view showing the current collector 20A connected to the edge of the electrode body 10A. FIGS. 34A and 34B are a cross-sectional perspective view and a cross-sectional view, respectively, taken along the line XXXIVa-XXXIVa of FIG. 33. Here, the current collector 20A has the configuration shown in FIG. 2.

As shown in FIGS. 34A and 34B, the electrode body 10A has, at the ends of the sealing plate 12 in the longitudinal direction L, a plurality of exposures 10a which are bundled at the ends of the sealing plate 12 in the width direction W. The second connector 22A abuts on the exposures 10a of the electrode body 10A on the first side surfaces 22a parallel to the longitudinal direction L of the sealing plate 12. In the abutting plane, the exposure 10a and the second connector 22A are then joined by laser welding, for example.

Figure 35:
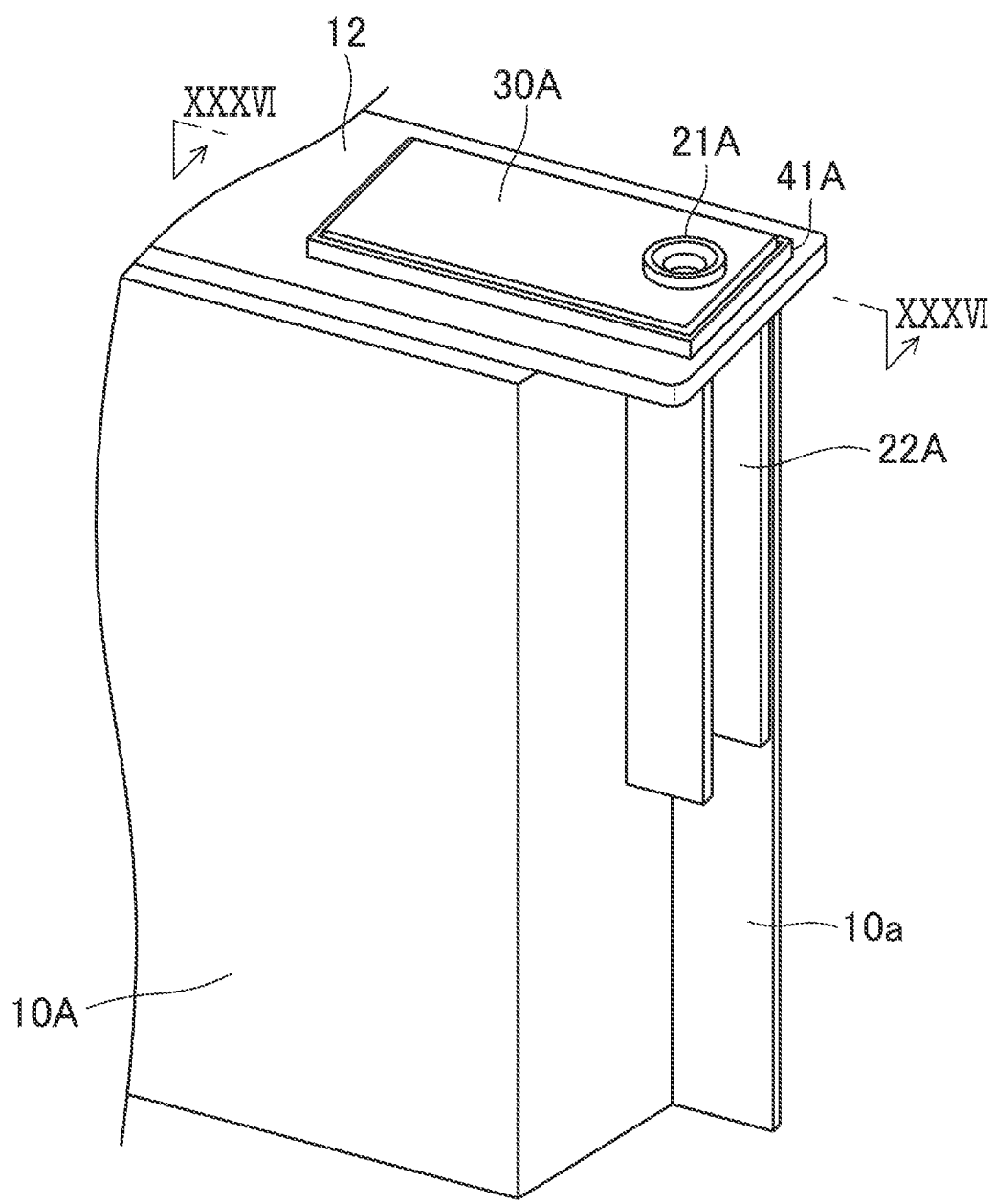
FIG. 35 is a partial perspective view showing a state after crimping a tip of a first connector of the current collector according to the other embodiment.
Figure 36:
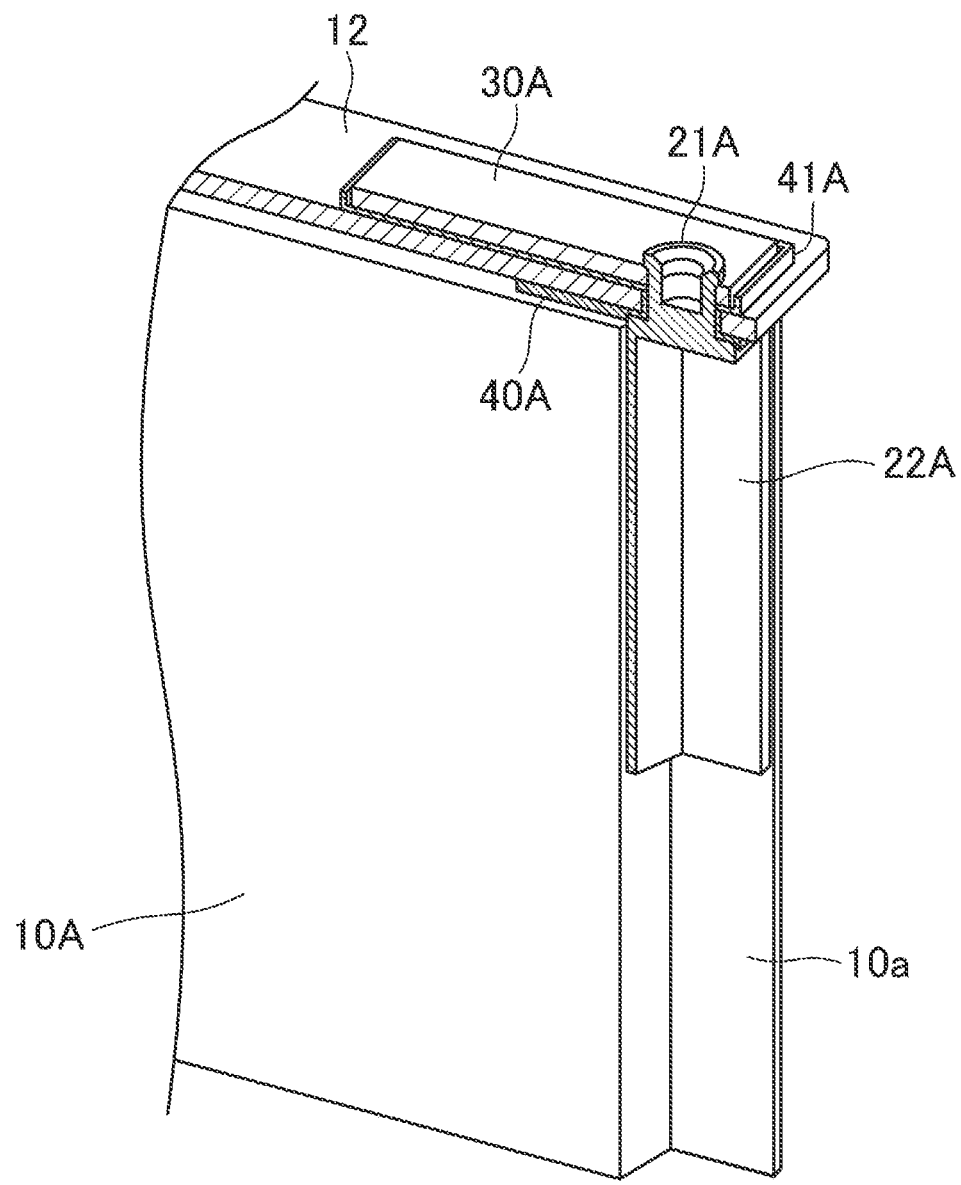
FIG. 36 is a cross-sectional perspective view taken along line XXXVI-XXXVI of FIG. 35.
Figure 37:
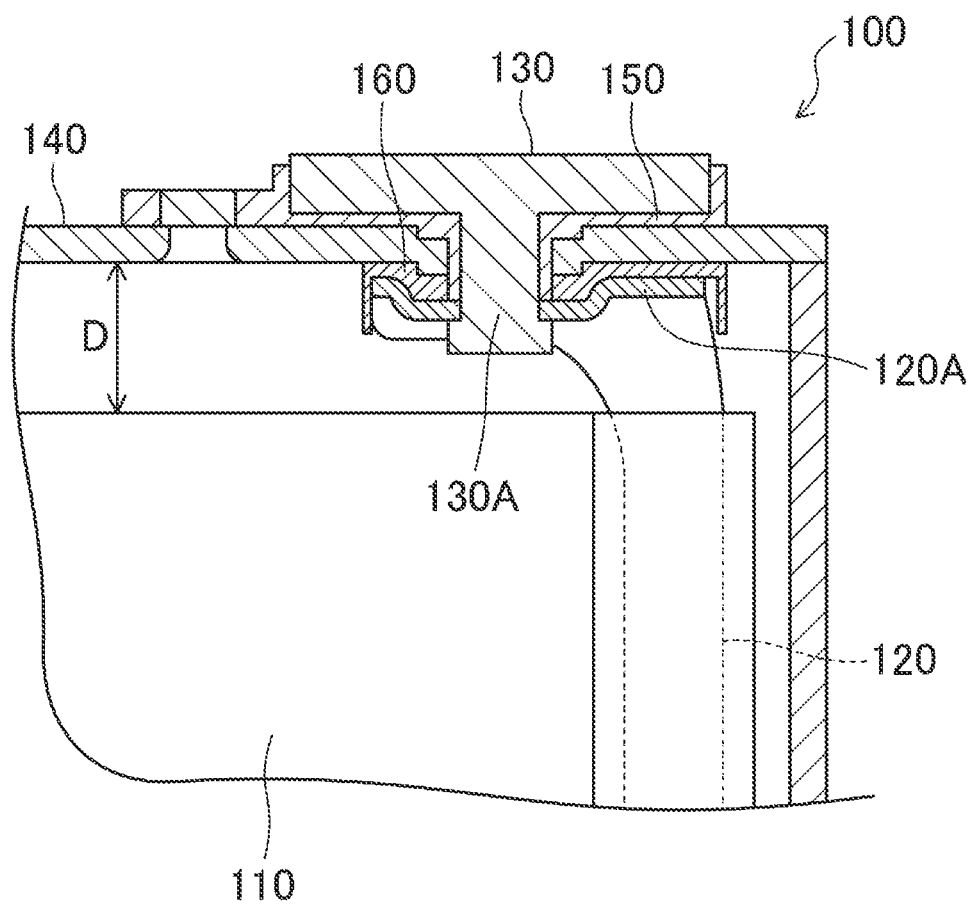
FIG. 37 is a partial cross-sectional view showing a current collecting structure of a typical secondary battery.

Like FIG. 6, FIG. 35 is a partial perspective view showing a state after causing the first connector 21A of the current collector 20A to penetrate the through-holes of the first insulating member 40A, the sealing plate 12, the second insulating member 41A, and the external terminal 30A, and crimping the tip of the first connector 21A projecting through the through-hole 30a of the external terminal 30A. FIG. 36 is a cross-sectional perspective view taken along the line XXXVI-XXXVI of FIG. 35.

As shown in FIGS. 35 and 36, the tip of the first connector 21A is crimped to connect the first connector 21A to the external terminal 30A and to fix the current collector 20A and the external terminal 30A to the sealing plate 12. In addition, the first insulating member 40A inside the sealing plate 12 is pressed by the upper surface 22c of the second connector 22A facing the first connector 21A so as to be fixed to the sealing plate 12.

In the embodiments described above, the second connector 22A is in the shape of a substantially rectangular parallelepiped block as shown in FIGS. 10 and 20. Alternatively, the block body may be in the shape of a cylinder, for example.

In the embodiments described above, as illustrated in FIGS. 4, 11, 25, and 31, the axis of the first connector 21A in the cylindrical shape and the first side surfaces 22a of the second connector 22A overlap each other in the width direction of the sealing plate 12. There is however no need for the two to overlap each other.

The rectangular secondary battery according to this embodiment is manufacturable by the following steps (a) to (d).

First, the current collector 20A including the first and second connectors 21A and 22A integrated into a single member is prepared (step (a)). The first connector is in the shape of a cylinder, whereas the second connector is in the shape of a plate or a block.

Next, the edge of the positive or negative electrode plate is connected to the second connector 22A of the current collector 20A. After that, the sealing plate 12 and the external terminal 30A are arranged above the current collector 20A (step (b)).

Next, the first connector 21A of the current collector 20A is cause to penetrate the through-holes of the sealing plate 12 and the external terminal 30A (step (c)).

After that, the tip of the first connector 21A is crimped to connect the first connector 21A to the external terminal 30A and to fix the current collector 20A and the external terminal 30A to the sealing plate 12 (step (d)).

After step (d), the peripheral edge of the first connector 21A and the external terminal 30A may be welded by a laser, for example (step (e)).

The type of the rectangular secondary battery according to this embodiment is not particularly limited. For example, the rectangular secondary battery is applicable to a lithium ion secondary battery, a nickel hydrogen secondary battery, or other batteries.

DESCRIPTION OF REFERENCE CHARACTERS

1 Rectangular Secondary Battery
10A. 10B Electrode Body
10a, 10b Exposure
11 Battery Case
12 Sealing Plate
12a Through-hole
20A, 20B Current Collector
21A First Connector
22A Second Connector
22Aa First Portion
22Ab Second Portion
22a First Side Surface
22b Second Side Surface
22c Upper Surface
23A Upper Plate
24 Joint Area
30A, 30B External Terminal
30a Through-Hole
40A First Insulating Member
41A Second Insulating Member
50 Insulating Holder
60 Insulating Member

The invention claimed is:

1. A rectangular secondary battery comprising:
an electrode body including a positive electrode plate and a negative electrode plate;
a rectangular battery case having an opening and housing the electrode body;
a sealing plate sealing the opening;
a current collector connected to an edge of the positive electrode plate or the negative electrode plate at a longitudinal end of the sealing plate; and
an external terminal located outside the sealing plate and connected to the current collector,
the current collector including a first connector and a second connector integrated into a single member, the first connector being connected to the external terminal, the second connector being connected to the edge of the positive electrode plate or the negative electrode plate,
the first connector penetrating through-holes of the sealing plate and the external terminal from an inside to an outside of the sealing plate, and having a tip crimped so as to be connected to the external terminal and to fix the current collector and the external terminal to the sealing plate,
the first connector being in a shape of a cylinder,
the second connector being in a shape of a plate or a block extending from the sealing plate toward the bottom of the battery case in a direction perpendicular to the sealing plate at the longitudinal end of the sealing plate,
the second connector having an upper surface and a first side surface,
the upper surface being parallel to the sealing plate,
the first side surface being parallel to a longitudinal direction of the sealing plate and extending from the upper surface toward the bottom of the battery case in a direction perpendicular to the sealing plate,
the second connector being connected to the edge of the positive electrode plate or the negative electrode plate on the first side surface, and an axis of the first connector in the shape of the cylinder and the first side surface of the second connector overlapping each other in the width direction of the sealing plate.

2. The rectangular secondary battery of claim 1, wherein the second connector has a second side surface parallel to a width direction of the sealing plate and facing the electrode body, and
the second side surface has an insulating member.

3. The rectangular secondary battery of claim 1, wherein the second connector of the current collector and the edge of the positive electrode plate or the negative electrode plate are joined by welding, and
a welding joint is covered with a covering member.

4. The rectangular secondary battery of claim 1, wherein the electrode body includes a plurality of electrode bodies, and
edges of positive electrode plates or negative electrode plates of the electrode bodies are connected to the current collector in common.

5. A method of manufacturing a rectangular secondary battery including:
an electrode body including a positive electrode plate and a negative electrode plate;
a rectangular battery case having an opening and housing the electrode body;
a sealing plate sealing the opening;
a current collector connected to an edge of the positive electrode plate or the negative electrode plate at a longitudinal end of the sealing plate; and
an external terminal located outside the sealing plate and connected to the current collector,
the method comprising:
(a) preparing the current collector including a first connector and a second connector integrated into a single member, the first connector being in a shape of a cylinder, the second connector being in a shape of a plate or a block;
connecting the edge of the positive electrode plate or the negative electrode plate to the second connector of the current collector;
(b) placing the sealing plate and the external terminal above the current collector;
(c) causing the first connector of the current collector to penetrate through-holes of the sealing plate and the external terminal; and
(d) crimping a tip of the first connector to connect the first connector to the external terminal and fix the current collector and the external terminal to the sealing plate,
the first connector being in a shape of a cylinder,
the second connector being in a shape of a plate or a block extending from the sealing plate toward the bottom of the battery case in a direction perpendicular to the sealing plate at the longitudinal end of the sealing plate,
the second connector having an upper surface and a first side surface,
the upper surface being parallel to the sealing plate,
the first side surface being parallel to a longitudinal direction of the sealing plate and extending from the upper surface toward the bottom of the battery case in a direction perpendicular to the sealing plate,
the second connector being connected to the edge of the positive electrode plate or the negative electrode plate on the first side surface, and an axis of the first connector in the shape of the cylinder and the first side surface of the second connector overlapping each other in the width direction of the sealing plate.

6. The method of claim 5, further comprising:

after (d), (e) welding a peripheral edge of the first connector and the external terminal.

* * * * *